United States Patent Office 3,504,997
Patented Apr. 7, 1970

---

3,504,997
PROCESS FOR DYEING AND PRINTING ANIONIC POLYMERIC FIBERS
Harry Foster Clapham, New Castle County, Del., assignor to E. I. du Pont de Nemours and Company, Wilmington, Del., a corporation of Delaware
No Drawing. Continuation-in-part of applications Ser. No. 331,104, Ser. No. 331,107, and Ser. No. 331,125, Dec. 17, 1963. This application Mar. 29, 1967, Ser. No. 626,685
Int. Cl. D06p 3/82
U.S. Cl. 8—21   9 Claims

ABSTRACT OF THE DISCLOSURE

Dyeing and printing anionic polymeric fibers with an aqueous dispersion of a heteropoly acid complex of a basic dye at a pH of 2 to 7 and a temperature up to 170° F., followed by development at 190° to 230° F., whereby the reaction which forms said basic dye complex is reversed and the parent basic dye is formed quantitatively on the anionic polymeric fibers. Novel heteropoly acid complexes of pendant basic azo and anthraquinone dyes.

CROSS-REFERENCES TO RELATED APPLICATIONS

This is a continuation-in-part of copending applications Ser. Nos. 331,104, 331,107 and 331,125, all filed Dec. 17, 1963 and now abandoned.

BACKGROUND OF THE INVENTION

This invention is directed to a novel process for the dyeing and printing of anionic polymeric fibers with basic dyes. The anionic polymeric fibers utilized in the practice of this invention include such synthetic fibers as the acid-modified polyacrylic fibers described in U.S. Patents 2,837,500 and 2,837,501, and the acid-modified polyester fibers described in U.S. Patent 3,018,272. Other fibers which contain acidic sites that attract basic dyes may also be colored by the process of the present invention. The basic dyes employed as starting materials in this novel process of coloration include all dyes that are sufficiently basic to form water-insoluble complexes (sometimes called salts or lakes) with heteropoly acids such as phosphomolybdic acid and others as illustrated hereinafter. The basic dyes which are useful in the present invention, therefore, include a wide range of diverse chemical types some of which are commonly referred to as cationic dyes while others are basic dyes which behave as cationic chromophores in acidic aqueous media. This invention is also directed to heteropoly acid complexes of pendant basic azo and anthraquinone dyes which complexes are useful in the dyeing and printing process of this invention.

It is recognized in the dyeing art that acid-modified polymeric materials are usually dyed at such a high rate of uptake of the basic dyes that level dyeings are frequently difficult to achieve. The acid-modified fibers are conventionally colored with basic dyes in the form of their water-soluble salts. Although basic retarders such as long-chain alkyl ammonium compounds, or acidic retarders such as the condensation product of formaldehyde and 2-naphthalenesulfonic acid have been used in dyeing applications to slow down the rate of dyeing, such dyeing processes are often difficult to control. Different basic dyes respond differently to such additives. This difficulty of control is increased when different dye types, e.g. acid, direct or disperse dyes are present in the same dyebath with the basic dyes. Acid-base precipitations between the additives and differnt dye types frequently occur in complex dyeing sytems, particularly at lower temperature, causing uneven and specky colorations.

In the printing of anionic polymeric fibers, basic dyes are conventionally dissolved in water and then incorporated into a thickener to form the printing paste. Retarders are not used in this application. However, the printing of basic dyes has been troublesome because of the formation of specks in the printing pastes and in the final prints. Although these specks appear in varying degrees with different basic dyes and in different printing systems, the specks are readily observed in light shades, and usually are attributed to either one or both of the following: (1) the tendency of the water-soluble basic dye to crystallize from its concentrated solution used in the printing paste, or (2) the precipitation of basic dye by other ingredients that may be present and necessary in the formulations e.g. anionic dyes, anionic dispersants, anionic carriers such as orthophenylphenol or anionic thickeners such as sodium alginate (e.g. "Keltex").

Heretofore, it has been necessary to limit the printing thickeners for basic or cationic dyes to nonionic types. Generally, the anionic thickeners are more economical and are used widely in the trade. However, the means for adapting basic dyes so they can be printed with strongly anionic thickeners has remained an unsolved problem. For instance, it has been extremely difficult to print anionic fibers, or mixed goods containing these fibers, commercially with cationic and anionically at lower temperatures, causing uneven and specky and specking.

It is, therefore, an object of the present invention to overcome the above stated troublesome features of applying basic dyes to anionic polymeric fibers, and to effect other advantages over prior practices, particularly to: (1) assure freedom from specks, which contain basic dye, and appear in the coloring formulation and in the colored fabric, (2) increase the stability of dye printing pastes against crystallization, (3) increase the ease with which basic dyes are incorporated into printing pastes and into dye-baths, (4) increase the compatibility of basic dyes with disperse dye systems found in the trade, and with anionic dyes, anionic carriers and anionic dispersants, (5) effect increased penetration of fiber by the dye, (6) eliminate or reduce the amount of retarder required to control dyeing rate and (7) provide basic dyes in a form which is easily handled in the novel coloring operations, namely in the form of finely divided, water-insoluble, dispersed pastes.

It is another object of this invention to provide novel complex salts of pendant basic azo and anthraquinone dyes, the use of which complexes overcomes the heretofore stated troublesome features of applying basic dyes to anionic polymeric fibers.

It is another object of this invention to provide dispersed aqueous pastes of the novel heretofore defined heteropoly acid complex salts together with a dispersant.

These and other objects of the invention will become apparent from the following description and claims.

DESCRIPTION OF THE INVENTION

It has now been discovered that the objects of this invention are achieved by employing basic dyes in the form of their water-insoluble heteropoly acid complexes. The heteropoly acids are selected from members of the group consisting of phosphotungstic, phosphomolybdic, phosphotungstomolybdic, silicotungstic, silicomolybdic and silicotungstomolybdic acids.

The novel process of the present invention comprises contacting the anionic polymeric fibers at a pH of about 2 to 7 and at a temperature of from about room temperature to 170° F. with a coloration medium comprising an aqueous dispersion of a basic dye-heteropoly acid complex mentioned above, followed by development at 190° to 230° F.

As disclosed in Colour Index, 2nd ed., vol. 1, p. 1617, basic dyes have been precipitated as water-insoluble pigments by heteropoly acids such as phosphomolybdotungstic acid. It is mentioned there that these pigments are much faster to light than their parent dyes. The improved light fastness is attributed to the presence of the pigment (dye-acid complex) in the substrate, e.g. paper pulp. It should be mentioned, however, that in the process of the present invention these pigments do not appear in the colored fibers, at least in any readily detected or significant amount. It appears that the reaction which forms the basic dye complexes is reversed in the novel dyeing operation and, quite surprisingly, the parent basic dye is formed on the selected anionic polymeric fibers in speck-free shades of outstanding levelness. The heteropoly acid portion of the complex which is set free is eliminated in the spent dyebath and in the washing of the finished colorations.

The basic dyes which are suitable for reaction with heteropoly acids to form the water-insoluble complexes employed in the present novel process include the following: diphenylmethanes (ketone imines) such as auramine; triarylmethane dyes such as C.I. Basic Green 1, C.I. 42,040, fuchsine (C.I. 42,500), resorcine violet (C.I. 43,520), victoria blue (C.I. 44,040), basic violet (C.I. 42,557) (Suppl.), rhoduline violet (C.I. 44,520), the basic dyes of U.S. Patent 3,021,344 (1962) to D. R. Baer; of U.S. Patent 3,032,561 (1962) to J. Pikl; of U.S. Patent 2,083,888 (1937) to Carl Winter et al.; xanthene dyes such as Pyronine G (C.I. 45,005), methylene red (C.I. 45,006), Rhodamine S (C.I. 45,050), saccharein (C.I. 45,070), Rhodamine 5G (C.I. 45,105), Rhodamine G (C.I. 45,150), Rhodamine 6G (C.I. 45,160), Rhodamine 12GM (C.I. 45,310); acridines such as Acridine Orange NO (C.I. 46,005), Diamond Phosphine GG (C.I. 46,035), Rheonine AL (C.I. 46,075); methine dyes such as basic red C.I. 48,015, basic red C.I. 48,013, basic violet C.I. 48,020, basic orange C.I. 48,035, basic yellow C.I. 48,055, basic red C.I. 48,070, basic yellow C.I. 48,060, basic yellow C.I. 48,065, basic dyes prepared from 2-methylene-1,3,3-trimethylindoline (Fischer's Base) as disclosed in U.S. Patent 2,734,901 and in "Synthetic Dyes" by Venkataraman, Academic Press Inc., New York, 1952, vol. II, p. 1174, basic methine dyes as described in U.S. Patents 2,155,459 and 2,164,793, basic azatrimethinecyanine dyes such as those disclosed by J. Voltz in Angew. Chem. (English edition), pp. 532–537, October 1962; thiazole dyes such as Thioflavine T (C.I. 49,005); indamine basic dyes such as basic green C.I. 49,405; azine dyes such as Mauve (C.I. 50,245), Safranine T (C.I. 50,240), basic violet C.I. 50,055, basic blue C.I. 50,306, Induline 6B Base (C.I. 50,400); oxazine dyes such as basic blue C.I. 51,004, Mendola's Blue C.I. 51,175, basic black C.I. 51,215; thiazine dyes such as Methylene Blue C.I. 52,015, basic green C.I. 52,020; azo dyes such as the azo-safranine dyes described in U.S. Patent 3,068,056 and U.S. 3,121,711, chrysoidine C.I. 11,270, basic brown C.I. 21,010, the basic azo dyes of U.S. Patent 2,821,926; British Patent 896,681; U.S. 2,-965,631; 3,020,272; 3,074,926; 3,119,810; of U.S. 3,033,-847 and 3,079,377; U.S. 2,099,525; 2,864,812; 2,864,813; 2,883,373; and 2,889,315; 2,022,921; 2,238,485; 2,397,-927; 2,906,747; 2,945,849; 3,096,318; 3,099,652; 3,099,-653 and U.S. Ser. No. 274,338, filed Apr. 19, 1963, now abandoned; British Patent 459,594; German Patents 1,085,276; 1,088,631 and 1,135,589; French Patents 1,-271,416 and 1,295,862; anthraquinone dyes such as the basic violet mono and dicondensation products of quinizarin with 2-dimethylaminoethylamine or 3-dimethyl-aminopropylamine (U.S. Patent No. 2,183,652), the basic dyes disclosed in U.S. Patent 2,716,655, the basic dyes disclosed in U.S. 2,153,012, the basic dyes disclosed in U.S. Patents 2,701,801 and 2,701,802, the basic dyes of U.S. Patents 2,888,467; 2,611,772; 2,737,517; 2,924,-609; 3,036,078; 3,040,064 and 3,076,821; Canadian Patent 624,035; British Patents 459,594; 807,241; 824,530 and 925,111; German Patents 714,986; 1,073,129 and 1,082,916; French Patent 1,277,495 and Belgian Patent 609,667; nitro basic dyes such as those disclosed in U.S. 2,834,793 and 2,834,794; and basic quinophthalone dyes such as those disclosed in U.S. 3,023,212.

As one novel class of complexes, the present invention is directed to heteropoly acid complex salts of pendant basic azo dyes, that is, azo dyes which are substituted by a primary, secondary or tertiary amino or quaternary ammonium group, said group being attached to the dye molecule through a pendant aliphatic carbon atom. The azo dyes which may be utilized as starting material for these novel complex salts include all azo compounds which contain pendant quaternary ammonium groups, as well as pendant primary, secondary and tertiary amino groups, and are sufficiently basic to form water insoluble complexes with heteropoly acids. Some of the basic azo dyes useful in the practice of the present invention belong to the cationic type while others are basic dyes which behave as cationic chromophores in acidic aqueous media.

Suitable pendant basic azo dyes are those of the formula D—A—Q in which D is an azo dye, A is a pendant aliphatic group attached to the azo dye nucleus and is selected from the group consisting of

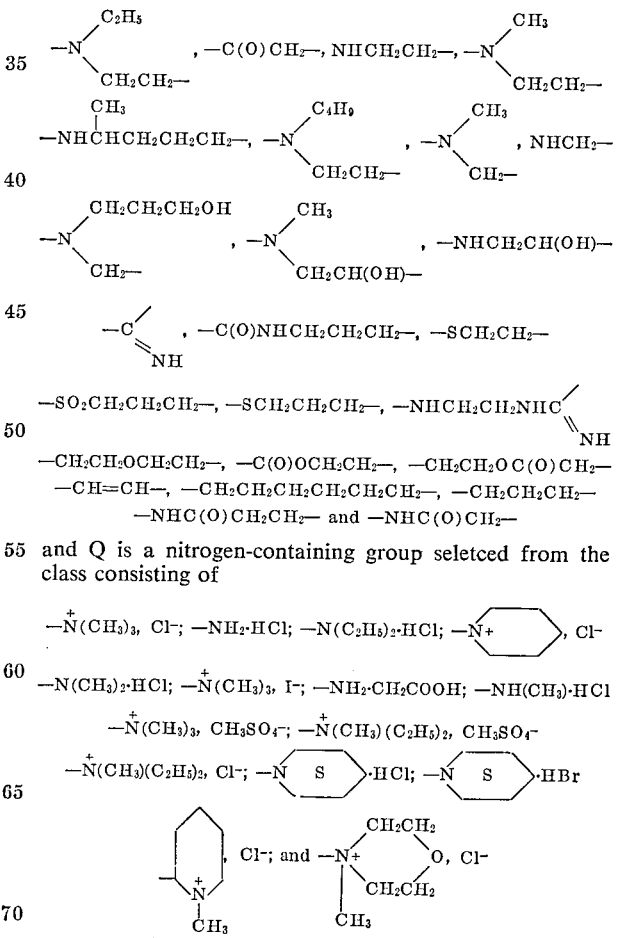

and Q is a nitrogen-containing group selected from the class consisting of

As another novel class of complexes, the present invention is also directed to heteropoly acid complex salts of pendant basic dyes of the anthraquinone series wherein a nitrogen, which nitrogen is sufficiently basic to form a water-insoluble salt with said heteropoly acid, is aliphatically bound to the anthraquinone nucleus or a derivative of said nucleus.

This invention is also directed to heteropoly acid complex salts of colored anthraquinone compounds which consist of a single anthraquinone nucleus to which are attached from 1 to 4 primary, secondary or tertiary amino or quaternary ammonium groups through a pendant aliphatic carbon atom.

The anthraquinone dyes employed as starting material for preparing these novel complexes include all colored anthraquinone compounds which contain pendant quaternary ammonium groups, as well as pendant primary, secondary and tertiary amino groups, and are sufficiently basic to form water-insoluble complexes with heteropoly acids. Some of the basic anthraquinone dyes useful in the present invention belong to the cationic type while others are basic dyes which behave as cationic chromophores in acidic aqueous media.

Suitable pendant basic anthraquinone dyes are those of the formula D—A—Q in which D is an anthraquinone dye, A is a pendant aliphatic group attached to the anthraquinone dye nucleus and is selected from the class consisting of

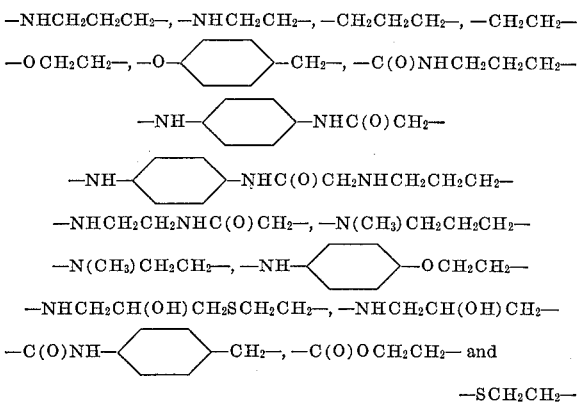

and Q is a nitrogen-containing group selected from the class consisting of

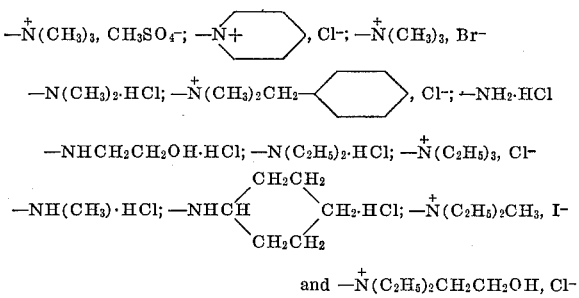

The present invention is also directed to a dispersed aqueous paste of a finely divided complex salt of the heretofore defined pendant basic azo and anthraquinone dyes together with a dispersant.

EXAMPLES OF THE INVENTION

PART I.—PRINTING

Example 1.—Basic dye complex compared with basic dye (a) Four parts of the red basic dye-complex paste prepared in Example 18(f) are mixed thoroughly with 36 parts of water (80° F.). The resulting dispersion is stirred into 60 parts of a neutral thickener, prepared by mixing five parts of modified locust bean gum thickener ("Polygum" 260, Polymer Industries, Inc., Springdale, Conn.) with 95 parts of water and neutralizing with acetic acid. One part of this concentrated printing paste (floor standard) is diluted by thoroughly mixing with nine parts of a neutral reduction thickener prepared by mixing 40 parts of water with 60 parts of a 5% aqueous solution of modified locust bean gum thickener. A speck-free printing paste for light shade is obtained.

One-half (0.5) part of the finely divided red basic dye employed as starting material in Ex. 18(f) (not complexed with heteropoly acid) is thoroughly mixed with 5 parts of glacial acetic acid, 28 parts of water (180° F.) and 5 parts of citric acid. This dye solution is stirred into 60 parts of neutral thickener as above. One part of the concentrated printing paste thus obtained is diluted by thoroughly mixing with nine parts of an acid reduction thickener prepared by mixing 5 parts of citric acid, 35 parts of water and 60 parts of a 5% aqueous solution of modified locust bean gum thickener. A printing paste for light shade is obtained and specks are observed when the paste is viewed under a light microscope.

The above described printing pastes for light shades are printed from an intaglio engraved roller onto separate fabrics of acid-modified polyacrylic fibers and acid-modified polyester fibers, respectively, and the prints are dried at 170° F. for two minutes in a flue dryer. The dried prints are steamed in a cottage steamer for one hour at 2 p.s.i.g., then rinsed, soaped for five minutes at 140° F. in a bath containing 0.07 g./l. of the sodium salt of the sulfate of the condensation product of ethylene oxide and oleyl alcohol, rinsed and dried. Red prints are obtained in each instance.

The prints prepared from the basic dye-heteropoly acid complex are smooth and contain no specks, whereas the prints prepared from the basic dye are smooth but contain many specks. The latter prints are unsatisfactory.

(b) A portion of the printing paste for light shade, prepared in the second paragraph of part (a) of the present example, is strained to remove the specks. The strained paste, upon printing as described above, gives prints which are smooth and speck-free. Although the amount of specking in the basic dye printing paste increases as the paste is allowed to stand (for one to two weeks), speck-free prints are obtained when the pastes are strained prior to printing. However, when equal portions of the strained paste of this example (b) and a speck-free printing paste, made by diluting 1 part of paste (c) of Example 2 with nine parts of the acid reduction thickener, are thoroughly mixed and then printed immediately, specky prints are obtained. On the other hand, when the printing paste for light shade, prepared in the first paragraph of part (a) of the present example, is mixed with the disperse dye printing paste (c) of Example 2 in this manner, and then printed, speck-free prints are obtained.

Example 2.—Compatibility of printing pastes of basic dye complex and of disperse dyes Concentrated printing pastes of: (a) the dispersed red basic dye complex, and (b) the basic dye itself are prepared according to the procedures described in Example 1(a). A third concentrated printing paste (c) is prepared by thoroughly mixing the following: 1 part of a finely divided blue powder of a 50:50 mixture of monochloro-4,8-diaminoanthrarufin and monochloro-4,5-diaminochrysazin, prepared by milling said dyes with an equal weight of lignin sodium sulfonate, an anionic dispersant, 5 parts of urea, and 34 parts of water. This mixture is heated to 180° F. under agitation and stirred into 60 parts of a neutral thickener (defined in Example 1(a) to obtain a smooth paste.

One part of a 50:50 mixture of the concentrated printing pastes (a) and (c) is blended with nine parts of neutral reduction thickener (described in Example 1(a) to provide a printing paste for light shade.

One part of a 50:50 mixture of the concentrated printing pastes (b) and (c) is blended with nine parts of acid reduction thickener (described in Example 1(a)) to provide a printing paste for light shade. It is noted that the basic dyes which are not in complexed form are dissolved in presence of acid.

The resulting printing pastes for light shades are roller printed onto fabrics of acid-modified polyacrylic and acid-modified polyester fibers, respectively and the prints are developed and finished as described in Example 1(a). Prints thus obtained from the blend of pastes (a) and (c) are speck-free, showing that the anionic dispersion of the basic dye complex and the anionically dispersed disperse dye are completely compatible. On the other hand, prints obtained from the blend of pastes (b) and (c) exhibit many specks, showing that the printing paste of the basic dye (not complexed) and the anionically dispersed disperse dye are incompatible.

Similar results are obtained in this example when the anthraquinone dye powder, used in printing paste (c), is replaced by an equal amount of the same dye in the form of an aqueous dispersion prepared by using the same anionic dispersant.

Example 3.—Mixing dyes prior to preparing the printing paste (a) An intimate mixture consisting of 4 parts of the red basic dye-complex paste prepared in Example 18(f), 4 parts of a 25% aqueous dispersion of a finely divided 50:50 mixture of monochloro-4,8-diaminoanthrarufin and monochloro-4,5-diaminochrysazin, using lignin sodium sulfonate as dispersant, 5 parts of urea, and 27 parts of water is stirred into 60 parts of neutral thickener (described in Example 1(a)) to obtain a smooth paste. One part of this concentrated paste is blended with nine parts of neutral reduction thickener (described in Example 1(a)) to obtain a printing paste for light shade.

(b) A printing paste for light shade is prepared from a concentrated paste in like manner by substituting 0.5 part of the finely divided red basic dye powder employed as starting material in Example 18(f) (not complexed with heteropoly acid) for the four parts of basic dye-complex paste used in part (a) of this example, and 30.5 parts of water are used instead of 27 parts.

(c) In a modification of part (b) above, 0.5 part of the red basic dye powder are first dissolved at 212° F. in a solution consisting of 16.5 parts of water, five parts of acetic acid and five parts of citric acid. After mixing the dye solution with eight parts of the anthraquinone dye dispersion, described in part (a) above, and five parts of urea, the mixture is stirred into 60 parts of neutral thickener, as before, to obtain a smooth concentrated paste. One part of this paste is blended with nine parts of acid reduction thickener (described in Example 1(a)) to obtain a printing paste for light shade.

The printing pastes (a), (b) and (c) are roller printed onto fabrics of acid-modified polyacrylic and acid-modified polyester fibers, respectively, and the prints are developed and finished as described in Example 1(a). Prints prepared from direct mixture (a) are speck-free, showing complete compatibility of the basic dye complex and the disperse dye dispersion. Prints prepared from direct mixtures (b) and (c) are very specky, and are unsatisfactory.

Example 4.—Variation in basic and disperse dyes (a) An intimate mixture consisting of: 4 parts of the blue basic dye-complex paste, prepared in Example 18(m), 1 part of finely divided 1-amino-4-hydroxy-2-(2-methoxyethoxy)anthraquinone, containing a small amount of anionic dispersant, 5 parts of urea, and 30 parts of water, after heating to 140° F., is stirred into 60 parts of neutral thickener (described in Ex. 1(a)) to provide a smooth concentrated printing paste. One part of this paste is diluted with nine parts of neutral reduction thickener (described in Example 1(a)) to obtain a printing paste for light shade.

(b) A printing paste for light shade is prepared as described in part (a) above, except that the four parts of paste of blue basic dye complex is replaced by 0.5 part of the finely divided blue basic dye itself (not complexed), and 33.5 parts of water are used instead of 30 parts.

Printing pastes (a) and (b) are roller printed onto fabrics of acid-modified polyacrylic and acid-modified polyester fibers, respectively, and the prints are developed and finished as described in Example 1(a).

Prints prepared from the direct mixture (a) are smooth and speck-free, showing excellent compatibility of the basic dye complex and the anionically dispersed disperse dye. Prints prepared from the direct mixture (b) are mottled and specky, showing incompatibility of the basic dye and the anionically dispersed disperse dye.

Example 5.—Compatibility of basic dye complex with fiber-reactive dyes

Concentrated printing pastes of: (a) the dispersed red basic dye complex, prepared n Example 18(s), and (b) the red basic dye itself are prepared according to the procedures described in Example 1(a). A third concentrated printing paste (c) is prepared as follows: 1 part of the turquoise fiber-reactive dye described in Example 1 of U.S. 3,232,931, 10 parts of urea, and 27 parts of water, are heated to 180° F., and the dye solution is stirred into 60 parts of neutral thickener (described in Ex. 1(a)), then 1 part of sodium bicarbonate and 1 part of the sodium salt of m-nitrobenzenesulfonic acid are added and mixed thoroughly to produce a smooth paste.

One part of a 50:50 mixture of the concentrated printing pastes (a) and (c) is blended with nine parts of neutral reduction thickener (described in Ex. 1(a)) to provide a printing paste for light shade.

One part of a 50:50 mixture of the concentrated printing pastes (b) and (c) is blended with nine parts of acid reduction thickener (described in Ex. 1(a)) to provide a printing paste for light shade.

(d) In a modification of the preparation of the above mixture of (a) and (c): 4 parts of dispersed paste of the red basic dye complex, prepared in Example 18(s), 1 part of the turquoise fiber-reactive dye, described in part (c) of this example, 10 parts of urea, and 28 parts of water, are heated to 180° F. and stirred into 55 parts of neutral thickener (described in Ex. 1(a)), 1 part of sodium bicarbonate and 1 part of the sodium salt of m-nitrobenzenesulfonic acid are added and mixed thoroughly, providing a smooth, concentrated printing paste. One part of this paste is diluted with nine parts of neutral reduction thickener (described in Ex. 1(a)) to obtain a printing paste for light shade.

(e) A printing paste for light shade is prepared as described in part (d) above, except that the four parts of paste of red basic dye complex are replaced by 0.5 part of the finely divided red basic dye itself (not complexed) and 31.5 parts of water are used instead of 28 parts.

The above described printing pastes for light shades are roller printed onto a blend fabric of 50% acid-modified polyacrylic fiber with 50% rayon fiber. The prints are developed; (1) in a cottage steamer as described in Example 1(a), and (2) by exposure in a continuous steam ager (air-free steam atmosphere at 218° F.) for 20 minutes, and finished as described in Example 1(a). The prints thus obtained from the blend of pastes (a) and (c) show proper shade development, indicating good compatibility of the basic dye complex with the fiber-reactive dye. On the other hand, the prints obtained from the blend of pastes (b) and (c) show unsatisfactory color development of the fiber-reactive dye, indicating the incompatibility of the basic dye (not complexed) and the fiber-reactive dye. The prints obtained from paste (d) are speck-free, showing that the basic dye complex and the fiber-reactive dye are compatible even in a direct mixture. The prints obtained from paste (c) contain many specks, showing that the basic dye (not complexed) and the fiber-reactive dye cannot be used in this manner.

Example 6.—Compatibility of basic dye complex with acid dyes

Concentrated printing pastes of: (a) the dispersed orange basic dye complex prepared in Example 18(e), and (b) the orange basic dye itself, C.I. 48,035, are prepared according to the procedures described in Example 1(a). A third concentrated printing paste (c) is prepared as follows: 1.5 parts of the yellow acid dye C.I. 18,820, 5 parts of urea, and 29.5 parts of water are heated to 212° F., and stirred into 60 parts of neutral thickener (described in Example 1(a)). 4 parts of ammonium sulfate are then added and mixed in thoroughly to obtain a smooth paste.

One part of a 50:50 mixture of the concentrated printing pastes (a) and (c) is blended with nine parts of neutral reduction thickener (described in Ex. 1(a)) to provide a printing paste for light shade.

One part of a 50:50 mixture of the concentrated printing pastes (b) and (c) is blended with nine parts of acid reduction thickener (described in Ex. 1(a)) to provide a printing paste for a light shade. It is noted that the basic dye which has not been complexed is dissolved in the presence of acid.

(d) In a modification of the preparation of the above mixture of (a) and (c): 4 parts of dispersed paste of the orange basic dye complex, prepared in Example 18(e), 1.5 parts of the yellow acid dye C.I. 18,820, 5 parts of urea, and 25.5 parts of water, are heated to 180° F., and stirred into 60 parts of neutral thickener (described in Ex. 1(a)). 4 parts of ammonium sulfate are then added and stirred thoroughly, providing a smooth, concentrated printing paste. One part of this paste is diluted with nine parts of neutral reduction thickener (described in Ex. 1(a)) to obtain a printing paste for light shade.

(e) A printing paste for light shade is prepared as described in part (d) above, except that the four parts of paste of orange basic dye complex is replaced by 0.5 part of the finely divided orange basic dye itself C.I. 48,035 (not complexed) and 29 parts of water are used instead of 25.5 parts.

(f) In a modification of part (e) above, an intimate mixture consisting of 0.5 part of the orange basic dye itself (C.I. 48,035), 1.5 parts of the yellow acid dye C.I. 18,820, 5.0 parts of glacial acetic acid, 5.0 parts of citric acid, and 28.0 parts of water, are heated to 212° F. and stirred into 60.0 parts of neutral thickener (described in Example 1(a)).

A smooth, concentrated printing paste is obtained. One part of this paste is diluted with nine parts of acid reduction thickener (described in Example 1(a)) to provide a printing paste for light shade.

The above described printing pastes for light shades are roller printed onto fabrics of acid-modified polyester fiber and polyamide fiber, respectively; and the prints are developed and finished as described in Example 1(a). Prints thus obtained from the blend of pastes (a) and (c) and the paste (d) are speck-free, showing that the anionic dispersion of the basic dye complex and the anionic acid dye are completely compatible. On the other hand, prints obtained from the blends of (b) and (c), and from pastes (e) and (f) exhibit many specks, showing that the basic dye (not complexed) and the acid dye are incompatible.

Example 7.—Compatibility of basic dye complex with direct dyes

Concentrated printing pastes of: (a) the dispersed blue basic dye complex prepared in Example 18(q), and (b) the blue basic dye itself (dye of British Patent 807,241, Ex. 2) are prepared according to the procedures described in Ex. 1(a). A third concentrated printing paste (c) is prepared as follows: 2 parts of the direct yellow dye (C.I. 19,555), 18 parts of urea, and 20 parts of water, are heated to 212° F., and stirred into 60 parts of neutral thickener (described in Ex. 1(a)) to obtain a smooth paste.

One part of a 50:50 mixture of the concentrated printing pastes (a) and (c) is blended with nine parts of a reduction thickener, containing five parts of urea, 35 parts of water and 60 parts of modified locust bean thickener (described in Ex. 1(a)) to provide a printing paste for light shade.

One part of a 50:50 mixture of the concentrated printing pastes (b) and (c) is blended with nine parts of a reduction thickener containing five parts of urea, five parts of citric acid, 30 parts of water and 60 parts of modified locust bean thickener (described in Ex. 1(a)) to provide a printing paste for light shade.

(d) In a modification of the preparation of the above mixture of (a) and (c): 4 parts of dispersed paste of the blue basic dye complex prepared in Example 18(q), 2 parts of the direct yellow dye C.I. 19,555, 15 parts of urea, and 19 parts of water, are heated to 212° F., and stirred into 60 parts of neutral thickener (described in Example 1(a)) to obtain a smooth, concentrated printing paste. One part of this paste is diluted with nine parts of a reduction thickener, containing five parts of urea, 35 parts of water and 60 parts of modified locust bean thickener (described in Example 1(a)) to provide a printing paste for light shade.

(e) A printing paste for light shade is prepared as described in part (d) above, except that the four parts of paste of blue basic dye complex are replaced by 0.8 part of the finely divided blue basic dye itself (not complexed) and 22.2 parts of water are used instead of 19 parts.

The above described printing pastes for light shades are roller printed and screen printed onto a blend fabric containing 50% acid-modified polyacrylonitrile fiber and 50% rayon fiber. The prints are developed and finished as described in Example 1(a). Prints thus obtained from the mixture of pastes (a) and (c) and the paste (d) are speck-free, showing the good compatibility of the basic dye complex with the direct dye. Prints obtained from the mixture of pastes (b) and (c) and the paste (e) exhibit specks, showing that the basic dye (not complexed) and the direct dye are not compatible.

Example 8.—Compatibility of basic dye complex with vat dyes

Concentrated printing pastes of (a) the dispersed blue basic dye complex prepared in Example 18(m), and (b) the blue basic dye itself C.I. 51,004 (not complexed) are prepared according to the procedure described in Example 1(a). A third concentrated smooth printing paste (c) is prepared by thoroughly mixing the following: 1.2 parts of the red vat dye C.I. 70,320 (in the form of a finely divided commercial paste which contains about 5%, based on dye weight, of the anionic dispersant which is the sodium salt of the condensation product of formaldehyde and 2-naphthalenesulfonic acid), 28.8 parts water (room temperature), and 70.0 parts neutral thickener (described in Ex. 1(a)).

One part of a 50:50 mixture of the concentrated printing pastes (a) and (c) is blended with nine parts of a neutral reduction thickener (described in Example 1(a)) to provide a printing paste for light shade.

One part of a 50:50 mixture of the concentrated printing pastes (b) and (c) are blended with nine parts of an acid reduction thickener (described in Example 1(a)) to provide a printing paste for light shade.

(d) In a modification of the preparation of the above mixture of (a) and (c): 4.0 parts of dispersed paste of the blue basic dye complex prepared in Example 18(m), 1.2 parts of the red vat dye C.I. 70,320 (in form of finely divided, commercial standard as described in part (c) above), 24.8 parts water (room temperature), and 70.0 parts neutral thickener (described in Ex. 1(a)) are intimately mixed to produce a smooth, concentrated printing paste. One part of this paste is diluted with nine parts of a neutral reduction thickener (described in Example 1(a)) to produce a printing paste for light shade.

(e) A printing paste for light shade is prepared as described in part (d) above, except that the four parts of blue basic dye complex are replaced by 0.5 part of the finely divided blue basic dye itself (not complexed) and 19.5 parts of water are used instead of 16 parts.

The above described printing pastes for light shades are roller printed on a blend fabric containing 50% acid-modified polyacrylonitrile fiber and 50% rayon fiber. The prints are dried at 170° F. for two minutes in a flue dryer. The dried prints are subjected to the following sequence of operations to fix the cationic dye on the acrylic fiber and the vat dye on the rayon fiber:

(1) Steam one hour at 2 p.s.i.g. in a cottage steamer,
(2) Pad at room temperature with 75% liquor pick-up (based on weight of the fabric) with a pad liquor which is an intimate mixture of the following ingredients (figures are in grams per liter): 30.0 sodium hydroxide, 60.0 anhydrous sodium carbonate, 60.0 sodium hydrosulfite, 0.7 surface active agent, the sodium salt of saturated long chain alcohol sulfate, 7.5 starch thickener ("Flotex"),
(3) Immediately pass the print through a flash ager (air-free steam) for 30 seconds at 240° F.,
(4) Immediately pass print through cold water followed by treatment for one minute at 140° F. in a 1% aqueous solution of hydrogen peroxide,
(5) Rinse in cold water, scour by heating at 180° F. for five minutes in a 0.2% aqueous solution of the sodium salt of the sulfate of the condensation product of ethylene oxide and oleyl alcohol, then rinse in water and dry the prints.

Prints thus obtained from the mixture of pastes (a) and (c) and the paste (d) are speck-free. Prints obtained from the mixture of pastes (b) and (c) and the paste (e) exhibit specks, showing that the basic dye itself (not complexed) and the vat dye system are not compatible.

Example 9.—Compatibility with textile printing thickeners

Concentrated printing pastes of: (a) the dispersed red basic dye complex and (b) the basic dye itself are prepared according to the procedures described in Ex. 1(a) except that a sodium alginate gum thickener, prepared by dissolving four parts sodium alginate powder ("Keltex") in 96 parts of water at room temperature, is substituted for the modified locust bean gum thickener of that example.

One part of the concentrated printing paste (a) is blended with nine parts of a reduction thickener prepared by mixing 40 parts of water at room temperature with 60 parts of sodium alginate gum thickener (as prepared above) to produce a printing paste for a light shade. One part of the concentrated printing paste (b) is blended with reduction thickener in a similar manner.

The resulting concentrated printing paste and paste for light shade of (a), the dispersed red basic dye complex, are roller printed onto fabrics of acid-modified polyacrylic and acid-modified polyester fibers, respectively, and the prints are developed and finished as in Example 1(a). The resulting prints are smooth and speck-free which indicates the excellent compatibility of the basic dye complex with the anionic sodium alginate gum thickener.

The concentrated printing paste and the paste for light shade prepared with the basic dye itself (b) are unsatisfactory for printing because they gelatinize or set. This gelatinous condition illustrates the incompatibility of the cationic (basic) dye itself with the anionic sodium alginate gum thickener.

PART II.—DYEING

Example 10.—Padding of basic dye or basic dye complex with acid dye (a–1) A solution consisting of 0.3 part of the basic blue dye C.I. 51,004, one part of glacial acetic acid and 98.7 parts of hot (195° F.) water is adjusted to pH 5.0 with sodium hydroxide.

(a–2) 0.3 part of the orange acid dye C.I. 26,550 is dissolved in 99.7 parts of hot (195° F.) water.

Solutions (a–1) and (a–2) are cooled to 80° F. and combined. A dark colored precipitate is observed in suspension in the resulting pad liquor. A pad-roll dyeing is then carried out by following the technique described by Robert M. Lesh in the American Dyestuff Reporter, vol. 49, 29–31, May 2, 1960. Said pad liquor is padded, from a two-roll padder, onto a blend fabric consisting of 55% acid-modified polyacrylonitrile fiber and 45% wool at a pickup of 55%, e.g. the pressure on the squeeze rolls is adjusted so that the fabric retains 55% of its weight of dye liquor. A small piece of the fabric (hereinafter referred to as the "test sample") is cut off and air dried. The remaining padded fabric is immediately rolled on an aluminum dowel. The roll of padded fabric is tightly wrapped with aluminum foil, then placed in an oven heated to 212° F., and maintained at 212° F. for four (4) hours. The roll is removed from the aluminum foil, and rinsed for two (2) minutes in warm water (120° F.). The grayish blue padding thus obtained is very specky, both before (as observed on test sample) and after development of color by heating.

The individual solutions (a–1) and (a–2), at 80° F., are free of precipitated material as shown by filtrations through fine cloth. However, a test portion of the above pad liquor, upon filtration in like manner, gives a considerable amount of insoluble residue.

When the process of this example (a) is repeated except that the acid dye solution (a–2) is omitted, one obtains on the acid-modified polyacrylonitrile fiber a level dyeing which is free of color specks.

(b) Part (a) of this example is repeated, except that the solution (a–1) which contains 0.3 part of basic blue dye C.I. 51,004 is replaced by 2.4 parts of the finely dispersed paste of the dye complex prepared in Example 18(m), which is then diluted with hot (195° F.) water to make a total of 100 parts. The pH of this bath is 5.5. A pad liquor is prepared by combining this bath with the solution of acid dye (a–2). The filtration test described in part (a) applied to this pad liquor, showed that no precipitation had occurred. Both the padding on the fabric blend and the final dyeing, performed as in part (a), from this pad liquor are smooth and speck-free.

Similar results are obtained when the basic dye complex used in the present example is replaced by any heteropoly acid complex of any of the basic dyes disclosed in this application. Likewise, the acid-modified polyacrylonitrile fiber may be replaced by acid-modified polyester fiber on which level dyeings are obtained by the basic dye-heteropoly acid complexes. When the wool portion of the fiber blends employed in this example is replaced by nylon, or other nitrogenous fiber, similar results are obtained.

Example 11.—Padding of basic dye or basic dye complex with vat dye (a–1) A solution consisting of 0.4 part of the basic orange dye C.I. 48,035, one part of glacial acetic acid and 98.6 parts of hot (195° F.) water is adjusted to pH 6.5 with sodium hydroxide.

(a–2) 0.04 part of the blue vat dye C.I. 69,825 (in the form of a finely divided commercial paste which contains about 5%, based on dye weight, of anionic dispersant which is the sodium salt of the condensation product of formaldehyde and 2-naphthalenesulfonic acid) is diluted with warm (120° F.) water to make a total of 100 parts.

Solution (a–1) and dispersion (a–2) are cooled to 80° F. and combined to form the pad liquor. A dark colored precipitate is observed suspended in the resulting liquor. Said pad liquor is then padded, from a two-roll padder, onto a blend fabric composed of 50% acid-modified polyacrylonitrile fiber and 50% cotton, at a pickup of 55%. A test sample is cut off and dried. The fabric is rolled as in Example 10 and is heated for four hours at 212° F. Without rinsing, the fabric is padded with a liquor consisting of: 40 parts of water, 30 parts of sodium hydroxide, and 30 parts of sodium hydrosulfite. The resulting fabric is steamed for 60 seconds at 212° F., the dyeing is then oxidized with a 0.25% aqueous solution of sodium perborate for 15 minutes at 120° F., followed by scouring in a 2% aqueous solution of oleate soap for five minutes at 212° F. Both the finished dyeing and the dried test sample exhibit color specking. When the amount of vat dye paste in this example is increased so that it contains 0.4 part of the dye C.I. 69,825, the amount of precipitation and specking are increased considerably.

The individual solution (a–1) and the fine dispersion (a–2), at 80° F., are free of aggregated material as shown by filtrations through fine cloth. However, a test portion of the pad liquor upon filtration in like manner, gives a considerable amount of insoluble residue.

When the process of this example (a) is repeated except that the vat dye dispersion (a–2) is omitted, one obtains on the acid-modified polyacrylonitrile fiber a level dyeing which is free of color specks.

(b) Part (a) of this example is repeated, except that the solution (a–1) which contains 0.4 part of the basic orange dye C.I. 48,035 is replaced by 3.1 parts of the finely dispersed paste of the dye complex, prepared in Example 18(e), which is then diluted with hot (195° F.) water to make a total of 100 parts. The pH of this preparation is 5.5. A pad liquor is prepared by combining this preparation with the vat dye suspension (a–2). Both the padding of the fabric blend and the final dyeing, performed as in part (a), from this pad liquor are level and speck-free. Filtration of a test portion of the pad liquor (b), leaves no residue.

The basic dye complex used in the present example may be replaced by any of the basic dye-heteropoly acid complexes disclosed herein. The acid-modified polyacrylonitrile fiber may be replaced in whole or in part by acid-modified polyester fiber on which level dyeings are obtained by the basic dye complexes. Likewise, when the cotton portion of the fiber blend is replaced in whole or in part by rayon or other related cellulosic fiber, similar results are obtained.

Example 12.—Padding of basic dye or basic dye complex with direct dye (a–1) A solution consisting of 0.4 part of the basic red dye of Example 16 of U.S. Patent 2,972,508 (1961), one part of glacial acetic acid and 98.6 parts of hot (195° F.) water is adjusted to pH 7.0 with sodium hydroxide.

(a–2) 0.3 part of the blue direct dye C.I. 34,130 is dissolved in 99.7 parts of hot (195° F.) water.

Solutions (a–1) and (a–2) are cooled to 80° F., and combined to form the pad liquor. A dark colored precipitate is observed suspended in the resulting liquor. Said pad liquor is then padded from a two-roll padder onto a blend fabric composed of 50% acid-modified polyacrylonitrile fiber and 50% cotton at a pickup of 55%. A test sample is cut off and air dried. The fabric is rolled and treated as in Example 10. The red and blue dyeing thus obtained is very specky, both before (as observed on test sample) and after development of color by heating for four hours at 212° F.

The individual solutions (a–1) and (a–2), at 80° F., are free of any precipitated material as shown by filtration through fine cloth. However, a test portion of the pad liquor, upon filtration in like manner, gives a considerable amount of insoluble residue.

When the process of this example (a) is repeated, except that the direct dye solution (a–2) is omitted, one obtains on the acid-modified polyacrylonitrile fiber a smooth dyeing which is free of color specks.

(b) Part (a) of this example is repeated, except that the solution (a–1) which contains 0.4 part of the basic red dye is replaced by 1.85 parts of the finely dispersed paste of the dye complex, prepared in Example 18(l), which is then diluted with hot (195° F.) water to make a total of 100 parts. The pH of this dispersion is adjusted to 7.0 with sodium hydroxide. A pad liquor is made by combining this dye dispersion with the direct dye solution (a–2). Both the padding and the final dyeing, performed as in part (a), from this pad liquor are smooth and free of specks.

Filtration of a test portion of the pad liquor (b) leaves no residue.

The basic dye complex used in the present example may be replaced by any of the basic dye-heteropoly acid complexes disclosed herein. The acid-modified polyacrylonitrile fiber may be replaced in whole or in part by acid-modified polyester fiber on which level dyeings are obtained by the basic dye complexes. Likewise, when the cotton portion of the fiber blend is replaced in whole or in part by rayon or other related cellulosic fiber, similar results are obtained.

Example 13.—(a) Incompatibility of mixture of basic dye and neutral-dyeing premetallized dye (a–1) A dye solution is prepared consisting of 0.3 part of the basic blue dye, C.I. 51,004, one part of glacial acetic acid and 98.7 parts of hot (195° F.) water.

(a–2) A second dye solution is prepared consisting of 0.3 part of the 1:2 Cr:azo dye complex prepared from the azo dye, 2-amino-4-nitrophenol→2-naphthol (a neutral-dyeing premetallized dye) in finely divided and dispersed form, and 99.7 parts of hot (195° F.) water.

Solutions (a–1) and (a–2) are cooled to 80° F., combined, and filtered through fine cloth. A considerable amount of residue is obtained, which demonstrates incompatibility of the two dye types employed.

The individual solutions (a–1) and (a–2) do not yield a residue when cooled to 80° F. and then filtered separately through fine cloth, indicating that they are free of precipitated material.

(b) Compatibility of basic dye complexes and neutral-dyeing premetallized dye.—Part (a) of this example is repeated, except that the solution (a–1) which contains 0.3 part of basic blue dye C.I. 51,004 is replaced by 3.45 parts of the finely dispersed paste of the dye complex, prepared in Example 18(n), which is then diluted with hot (195° F.) water to make a total of 100 parts. This dispersion is combined with solution (a–2) and the mixture is filtered through fine cloth. No residue is observed on the cloth, which demonstrates compatibility of the basic dye complex and the chromed azo dye.

Similar results are obtained when the dispersed paste of Example 18(n) used in this example (b), is replaced by equivalent amounts of any of the dispersed pastes of Example 18, or by dispersed pastes of the heteropoly acid complexes of any of the basic dyes listed in the present application.

Example 14.—(a) Incompatibility of mixture of basic dye and acid-dyeing premetallized dye (a–1) A dye solution is prepared consisting of 0.25 part of the basic orange dye described in Example 13 of U.S. Patent 2,821,526 (1958), one part of glacial acetic acid and 98.75 parts of hot (195° F.) water.

(a–2) Another dye solution is prepared consisting of 0.5 part of the acid blue dye C.I. 14,880 (an acid-dyeing premetallized dye) and 99.5 parts of hot (195° F.) water.

Solutions (a–1) and (a–2) are cooled to 80° F., combined, and filtered through fine cloth. Considerable amount of residue is obtained, which demonstrates incompatibility of the two dye types employed.

The individual solutions (a–1) and (a–2) do not yield a residue when cooled to 80° F., and then filtered separately through fine cloth, indicating that they are free of precipitated material.

(b) Compatibility of basic dye complexes and acid-dyeing premetallized dye.—Part (a) of this example is repeated, except that the solution (a–1) which contains 0.25 part of the basic orange dye employed therein is replaced by 1.0 part of the finely dispersed paste of the dye complex, prepared in Example 18(aa), which is then diluted with hot (195° F.) water to make a total of 100 parts. This dispersion is combined with solution (a–2) and the mixture is filtered through fine cloth. No residue is observed on the cloth, which demonstrates compatibility of the basic dye complex and the acid-dyeing premetallized dye C.I. 14,880.

Similar results are obtained when the dispersed paste of Example 18(aa), used in this example (b), is replaced by equivalent amounts of any of the dispersed pastes of Example 18, or by dispersed pastes of the heteropoly acid complexes of any of the basic dyes disclosed in the present application.

Example 15.—(a) Incompatibility of mixture of basic dye and fiber-reactive dye (a–1) A dye solution is prepared consisting of 0.25 part of the basic yellow dye, C.I. 48,055, one part of glacial acetic acid and 98.75 parts of hot (195° F.) water.

(a–2) Another dye solution is prepared consisting of 1.0 part of the fiber-reactive red dye described in Example 18 of Belgian Patent 613,586 and 99 parts of hot (195° F.) water.

Solutions (a–1) and (a–2) are cooled to 80° F., combined, and allowed to stand for one (1) hour. The bath gels during this period. The gel is then filtered through fine cloth. A heavy residue is obtained, which demonstrates incompatibility of the two dye types employed.

The individual solutions (a–1) and (a–2) do not yield a residue when cooled to 80° F., and then filtered separately through fine cloth, indicating that they are free of precipitated material.

(b) Compatibility of basic dye complexes and fiber-reactive dye.—Part (a) of the present experiment is repeated, except that the solution (a–1) which contains 0.25 part of basic yellow dye C.I. 48,055 employed therein, is replaced by 2.1 parts of the finely dispersed paste of the dye complex prepared in Example 18(b), which is then diluted with 97.9 parts of hot (195° F.) water. This dispersion is combined with solution (a–2) and the mixture is filtered through fine cloth. No residue is observed on the cloth, which demonstrates compatibility of the basic dye complex and the fiber-reactive dye.

Similar results are obtained when the dispersed paste used in this example (b) is replaced by equivalent amounts of dispersed pastes of the heteropoly acid complexes of any of the basic dyes disclosed in the present application.

EXAMPLE 16

(a) An aqueous bath is prepared which contains 200 parts of water, 0.03 part of surfactant (the condensation product of 20 moles of ethylene oxide and one mole of $C_{18}$ alcohol), 0.10 part of glacial acetic acid and 1.0 part of sodium sulfate (anhydrous). With the bath at a temperature of 100° F., 10 parts of fabric woven of yarns of acid-modified polyacrylonitrile fiber are entered and the temperature is raised to 160° F. 1.5 parts of the dispersed paste of the red basic dye complex of Example 18(dd) are added, the bath temperature is gradually raised to 205° F., and the dyeing is continued for one hour. Finally, the dyeing is continued for one hour at 212° F. After rinsing and drying, the fabric is observed to be dyed a uniform red shade.

Several acid-modified fibers of the polyacrylonitrile, modacrylic and polyethylene terephthalate type, produced by different manufacturers, were dyed in uniform red shades by following the procedure of the present example.

In like manner, uniform shades are obtained on the above fibers when other basic dye complexes are used such as those illustrated by the examples of part III, below.

(b) The process of part (a) of this example is repeated except that; (1) the fabric is replaced by one consisting of an 80:20 blend of acid-modified polyacrylonitrile and wool, and (2) the dye is replaced by 1.6 parts of the dispersed paste of the blue basic dye complex of Example 18(m). A level blue dyeing is obtained on the polyacrylic fiber and the wool is only slightly stained. In a control experiment, using an equivalent amount (0.2 part) of the original blue dye (uncomplexed), C.I. 51,004, the wool staining was heavier. Similar results are obtained when other basic dyes and their complexes are employed such as those disclosed in part III of this application.

(c) In the process of part (b) of this example 0.1 part of the black acid dye C.I. 27,075 is added, in addition to the blue basic dye complex. The fibers of the polyacrylic-wool blend are dyed in full level shades of blue and black, respectively. The basic dye complex and the acid dye exhibit excellent compatibility in the dyebath.

(d) Pad-steam applications to carpet stock.

Carpet stock of acid-modified polyacrylic fiber is impregnated with a 1% aqueous solution of the red basic dye described in Example 16 of U.S. Patent 2,972,508. In a separate dyeing, carpet stock of this fiber is also impregnated with a padding liquor which contains 46 grams per liter of the dispersed paste of the basic red dye complex of Example 18(l) of this patent application. The respective impregnated fibers are steamed in an autoclave for 30 minutes at 10 p.s.i.g. (about 230° F.). The dyed stock is then washed and dried. The stock which had been impregnated with the dye solution is poorly penetrated by the dye, whereas the stock which had been impregnated with the dispersed paste of the phosphomolybdic acid complex of the same dye is well penetrated and is dyed in a level red shade.

Similar results are obtained when carpet stock is dyed as described in this example (d) except that the other basic dyes disclosed in this application and their counterparts as heteropoly acid complexes, respectively, are employed.

PART III.—PREPARATION OF BASIC DYE-HETEROPOLY ACID COMPLEXES

Example 17.—(a) Phosphomolybdate complex of C.I. Basic Yellow 11, C.I. 48,055

135 parts of the yellow basic dye C.I. 48,055 are dissolved in 6,000 parts of water containing 40 parts of formic acid by heating to 80° to 85° C. A phosphomolybdic acid solution is prepared in a separate vessel by dissolving 165 parts of sodium molybdate ($Na_2MoO_4$) and 9 parts of disodium acid phosphate ($Na_2HPO_4 \cdot 7H_2O$) in 2400 parts of water and then acidifying with 120 parts of formic acid. The light yellow colored phosphomolybdic acid solution is added to the hot dye solution until a spot test on paper shows no color bleed, indicating that the dye is completely precipitated as the phosphomolybdic acid complex. The dye slurry is heated for approximately one hour at 90° to 95° C. and then filtered. The filter cake is washed with water to remove the excess acid. The resulting filter cake of the phosphomolybdic acid complex of the dye is converted to a dispersed paste as follows: 60 parts of dispersant (the sodium salt of the condensation product of formaldehyde and 2-naphthalene sulfonic acid) are added to the wet press cake which consists of 187 parts of dye complex and 540 parts of water. A fine dispersion of the dye complex is obtained by subjecting this paste to milling action by any known conventional techniques such as a colloid mill or by stirring the paste in the presence of sand (see British Patent 435,614). The fine, dispersed paste of the phosphomolybdate complex of the dye is further protected from settling by the addition and thorough mixing of dextrin equivalent to about 10% on the weight of the paste. When a test portion of the paste product dissolved in dimethyl formamide containing acetic acid) is compared spectrophotometrically with a like solution of the pure crystalline dye, it is found that about 6.4 parts of the paste product have the same color value as one part of the pure basic dye C.I. 48,055.

(b) Phosphotungstic acid complex of Basic Yellow C.I. 48,055.—The procedure for the preparations of the phosphotungstic acid complex of Basic Yellow 11 is like that for the phosphomolybdate in part (a) of this example except that 225 parts of sodium tungstate (Na₂WO₄) are used in place of the 165 parts of sodium molybdate.

(c) Phosphotungstomolybdic acid complex of Basic Yellow C.I. 48,055.—The procedure is like that in part (a) except that a mixture of 168 parts of the sodium tungstate and 72 parts of the sodium molybdate are used instead of the sodium molybdate alone. The ratio of sodium tungstate to sodium molybdate may be varied extensively.

(d) Silicomolybic acid complex of Basic Yellow C.I. 48,055.—135 parts of Basic Yellow C.I. 48,055 are dissolved at 80° to 85° C. in 6000 parts of water containing 40 parts of formic acid. A solution of silicomolybdic acid is prepared in a separate vessel by dissolving 156 parts of sodium molybdate (Na₂MoO₄) and 150 parts of a 40% solution of sodium silicate (Na₂Si₄O₉) in 3000 parts of water at 90° C. 1150 parts of 18% (by weight) sulfuric acid are added to the hot sodium molybdate-sodium silicate solution. The silicomolybdic acid solution so obtained is added to the hot dye solution to precipitate the silicomolybdate complex of the dye. The dye complex is filtered while hot and washed free of strong mineral acid with cold water. The dye complex is then dispersed and milled as described in part (a) above for the phosphomolybdate complex.

(e) Silicotungstic acid complex of Basic Yellow, C.I. 48,055.—The procedure of part (d) is followed except that the 156 parts of sodium molybdate are replaced by 225 parts of sodium tungstate.

(f) Silicotungstomolybdic acid complex of Basic Yellow C.I. 48,055.—The procedure of part (d) is followed except that the solution of inorganic salts is replaced by a solution which contains 150 parts of sodium silicate (40% solution), 78 parts sodium molybdate and 112 parts of sodium tungstate in 3000 parts of water.

Example 18

Following the procedures outlined in the preceding example, in which a basic dye is precipitated from solutions with heteropoly acids followed by isolation of the resulting complexes and conversion to dispersed pastes, the basic dyes listed in the first column of Table I are converted to their complex salts and then to dispersed pastes. The heteropoly acid complexes are listed in column 2. The basic dye contents of the pastes, shown in column 3, are calculated as uncomplexed dye equivalent based on comparative dyeing strengths of the complexed and uncomplexed forms of the dyes on acid-modified polyacrylonitrile fiber. The basic dye content of the dispersed pastes varies with the amount of water present in the filter cake of the dye complex and with the complexing heteropoly acid employed.

TABLE I

| Ex. 18 | Basic dye | Heteropolyacid complex | Basic dye in dispersed paste (percent by wt.) |
|---|---|---|---|
| (a) | C.I. 48,055 | Phosphomolybdate | 18.1 |
| (b) | C.I. 48,055 | Phosphotungstomolybdate | 11.8 |
| (c) | C.I. 48,055 | Silicomolybdate | 7.5 |
| (d) | C.I. 48,055 | Silicotungstomolybdate | 7.0 |
| (e) | C.I. 48,035 | Phosphomolybdate | 13.0 |
| (f) | U.S. 2,164,793, Ex. 1 | do | 12.5 |
| (g) | U.S. 2,164,793 Ex. 1 | Phosphotungstate | 10.7 |
| (h) | U.S. 2,164,793 Ex. 1 | Phosphotungstomolybdate | 13.0 |
| (i) | U.S. 2,164,793 Ex. 1 | Silicomolybdate | 8.3 |
| (j) | U.S. 2,164,793 Ex. 1 | Silicotungstomolybdate | 11.3 |
| (k) | U.S. 2,155,459, pg. 2, li. 26 from Fischer's aldehyde and p-anisidine. | Phosphomolybdate | 24.0 |
| (l) | U.S. 2,972,508, Ex. 16 | do | 21.7 |
| (m) | C.I. 51,004 | do | 12.5 |
| (n) | C.I. 51,004 | Phosphotungstomolybdate | 11.6 |
| (o) | C.I. 51,004 | Silicomolybdate | 5.6 |
| (p) | C.I. 51,004 | Silicotungstomolybdate | 8.4 |
| (q) | B.P. 807,241, Ex. 2 | Phosphomolybdate | 19.3 |
| (r) | B.P. 807,241, Ex. 2 | Phosphotungstomolybdate | 19.8 |
| (s) | C.I. 45,215 | Phosphomolybdate | 12.5 |
| (t) | C.I. 45,215 | Silicotungstomolybdate | 12.1 |
| (u) | U.S. 2,883,373, Ex. 1 | Phosphomolybdate | 12.8 |
| (v) | U.S. 2,883,373, Ex. 1 | Phosphotungstomolybdate | 13.2 |
| (w) | U.S. 2,883,373, Ex. 1 | Silicomolybdate | 12.5 |
| (x) | U.S. 2,864,813, Ex. 1 | Phosphomolybdate | 25.0 |
| (y) | U.S. 2,864,813, Ex. 1 | Silicotungstomolybdate | 22.7 |
| (z) | U.S. 2,889,315, No. 9 in table of Ex. 1. | Phosphomolybdate | 11.9 |
| (aa) | U.S. 2,821,526, Ex. 13 | do | 24.8 |
| (bb) | U.S. 2,821,526, Ex. 13 | Phosphotungstomolybdate | 26.0 |
| (cc) | U.S. 2,821,526, Ex. 13 | Silicotungstomolybdate | 25.7 |
| (dd) | C.I. 48,013 | Phosphomolybdate | 12.5 |
| (ee) | C.I. 48,013 | Phosphotungstomolybdate | 13.1 |

Similarly, any of the basic dyes disclosed above in the section of the disclosure headed "Description of the Invention" may be employed in the processes of Example 17 to provide dispersed pastes of the dye-heteropoly acid complexes. The dispersed pastes thus obtained are thin, free-flowing liquid pastes having dye-complex particles generally one micron or less in size. The pastes are readily diluted with hot or cold water and are easily incorporated into the viscous solutions or thickeners used for textile printing. In printing pastes thus obtained, the dye particles remain dispersed so that speck-free prints are produced from them, even after the printing pastes are stored for long periods. Furthermore, the dispersed basic dye complexes may be mixed with acid, direct, disperse and other dye types without danger of precipitation or incompatibility so that fabrics of mixed fiber construction which contain acid-modified fibers can be printed or dyed simultaneously with the types of dyes specifically required for the fibers present.

PART IV.—PENDANT BASIC AZO DYE COMPLEXES

Example 19

(a) 140 parts of the pendant basic azo dye

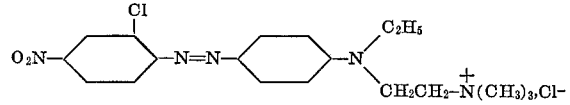

(prepared by using 2-chloro-4-nitroaniline as the diazo component in the procedure described in Example 5 of U.S. Patent 2,099,525) are dissolved in 7,000 parts of water by heating to 85° C. A phosphomolybdic acid solution is prepared in a separate vessel by dissolving 110 parts of sodium molybdate (Na₂MoO₄) and 6 parts of disodium acid phosphate (Na₂HPO₄·7H₂O) in 3,600 parts of water and then acidifying with 80 parts of 88% formic acid. The light yellow colored phosphomolybdic acid solution is added to the hot dye solution until a spot test on paper shows no color bleed, indicating that the dye is completely precipitated as the phosphomolybdic acid complex. The dye slurry is heated for one hour at 90° to 95° C. and then filtered. The filter cake is washed with water to remove excess acid. The resulting filter cake of the phosphomolybdic acid complex salt of the dye is converted to a dispersed paste as follows: 20 parts of dispersant (the sodium salt of the condensation product of formaldehyde and 2-naphthalenesulfonic acid) are added to the wet press cake which consists of 223 parts of the dye complex and 280 parts of water. A fine dispersion of the dye complex is obtained by subjecting this paste to milling action by any of known conventional techniques such as colloid milling or by stirring the paste in the presence of sand (see British Patent 435,614). The fine, dispersed paste of the phosphomolybdate complex of the dye is further protected from settling by the addition and thorough mixing of dextrine equivalent to about 10% on the weight of the paste.

When a test portion of the red dye paste thus obtained is dissolved in dimethyl formamide containing acetic acid and compared spectrophotometrically with a like solution of the pure crystalline dye, it is found that 4.25 parts of the paste have the same color value as one part of the original pure crystalline dye.

(b) The phosphotungstic acid complex of the pendant basic azo dye used in part (a) of this example is prepared by following the above procedure except that the 110 parts of sodium molybdate are replaced by 160 parts of sodium tungstate (Na₂WO₄).

(c) The phosphotungstomolybdic acid complex of the same dye is prepared by replacing the 110 parts of sodium molybdate in the procedure of part (a) of this example with a mixture of 32 parts of sodium tungstate and 88 parts of sodium molybdate. The ratio of the tungstate and molybdate salts may be varied extensively.

(d) The silicomolybdic acid complex salt of the pendant basic azo dye used in part (a) of this example is prepared by first dissolving 140 parts of the dye in 7,000 parts of water containing 31 parts of formic acid. A solution of silicomolybdic acid is prepared in a separate vessel by dissolving 121 parts of sodium molybdate and 117 parts of a 40% solution of sodium silicate (Na₂Si₄O₉) in 2,400 parts of water at 90° C. 890 parts of 18% (by weight) sulfuric acid are added to the hot sodium molybdate-sodium silicate solution. The silicomolybdic acid solution so obtained is added to the hot dye solution to precipitate the silicomolybdate complex of the dye. The precipitate is filtered off while hot and washed free of strong mineral acid with water. The dye complex salt is then dispersed and milled as described in part (a) above.

(e) The silicotungstic acid complex is prepared by following the procedure of part (d) above except that the 121 parts of sodium molybdate are replaced by 175 parts of sodium tungstate.

(f) The silicotungstomolybdic acid complex is prepared by following the procedure of part (d) above except that the solution of inorganic salts is replaced by a solution which contains 117 parts of a 40% solution of sodium silicate, 60 parts of sodium molybdate and 87 parts of sodium tungstate in 2,400 parts of water.

The dye-heteropoly acid complex salts prepared in this example dye and print acid-modified polyacrylic and acid-modified polyester fibers in level, speck-free red shades, even though the conventional anionic additives are employed in the dyeing and printing systems.

Example 20

90 parts of the pendant basic azo dye of the formula

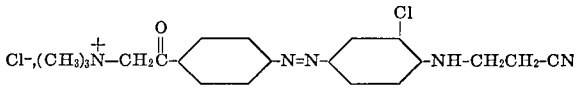

(Example 13 of U.S. Patent 2,821,526) are dissolved in 5,300 parts of water containing 50 parts of formic acid while heating the solution to 85° C. A solution of phosphomolybdic acid (made by stirring 110 parts of sodium molybdate, 6 parts of disodium acid phosphate and 80 parts of formic acid into 1,500 parts of water) is added to the dye solution until a spot test on paper shows that the dye is completely precipitated. The temperature of the slurry is raised to 95° C. where it is maintained for 15 minutes. The dye complex salt is then filtered off and washed with water until free of acid. The filter cake, which consists of 106 parts of the dye complex and 133 parts of water, is mixed with 7.5 parts of lignin sodium sulfonate, 7.5 parts of the sodium salt of the condensation product of formaldehyde and 2-naphthalenesulfonic acid, 100 parts of water and is thoroughly milled. According to spectrophotometric determination (see Example 19(a)) 3.5 parts of this dispersed paste have the same color value as one part of the original pure crystalline dye. The dispersed paste is used to dye and print acid-modified polyacrylic and polyester fibers in level, speck-free yellow shades, even though the conventional anionic additives are employed in the dyeing and printing systems.

Example 21

When the pendant basic azo dye used in Example 19, parts (a) to (f), is replaced with chemically equivalent amounts of any of the following pendant basic azo dyes their corresponding heteropoly acid complex salts are obtained which significantly result in the advantages heretofore mentioned:

(1) The hydrochloride of the dye of Example 5 of U.S. Patent 2,022,921,

(2) The hydrochloride of the dye of Example 6 of U.S. Patent 2,022,921,

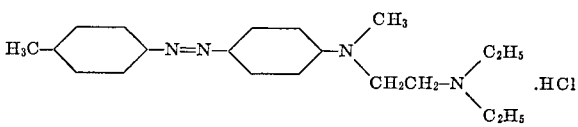

(3) The hydrochloride of the dyes of Example 1 of U.S. Patent 2,022,921,

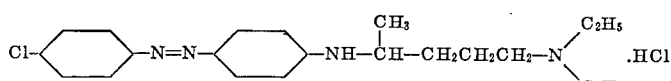

(4) The dyes of Example 1 of U.S. Patent 2,099,525 (e.g.),

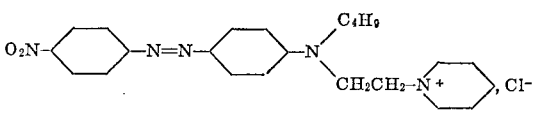

(5) The dyes of Example 5 of U.S. Patent 2,099,525 (e.g.),

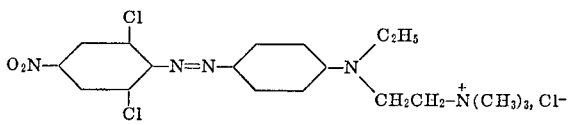

(6) The hydrochloride of the dye of Example 1 of U.S. Patent 2,238,485,

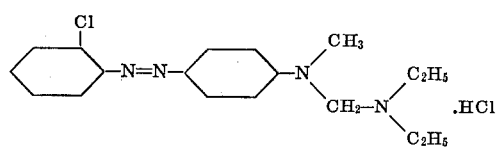

(7) The hydrochloride of the disazo dye, being the fifth compound in the table on p. 2 of U.S. Patent 2,238,485,

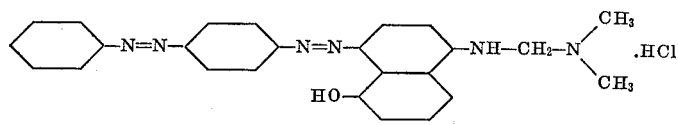

(8) The heterocyclic quaternized dye, being the sixth compound in the table on p. 2 of U.S. 2,238,485,

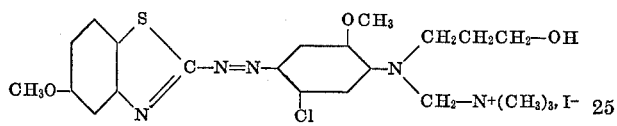

(9) The hydrochloride of the dye of Example 5 of U.S. 2,397,927,

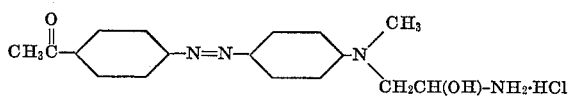

(10) The hydrochloride of the dye of Example 9 of U.S. 2,397,927,

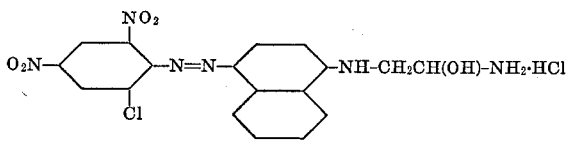

(11) The hydrochloride of the dye of Example 2 of U.S. 2,821,526,

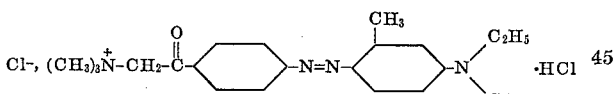

(12) The hydrochloride of the dye of Example 7 of U.S. 2,821,526,

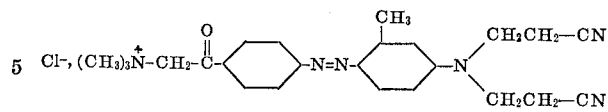

(13) The hydrochloride of the dye of Example 8(m) of U.S. 2,821,526,

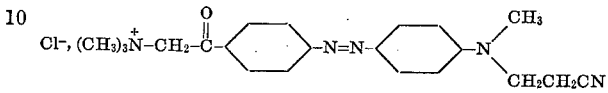

(14) The dye of Example 1 of U.S. 2,906,747,

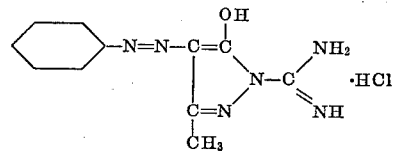

(15) The dye of Example 5 of U.S. 2,906,747,

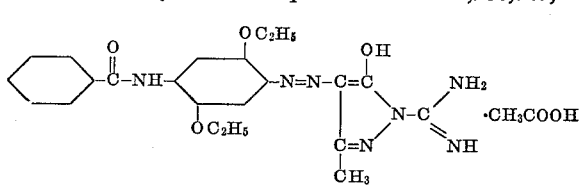

(16) The dye of Example 16 of U.S. 2,906,747,

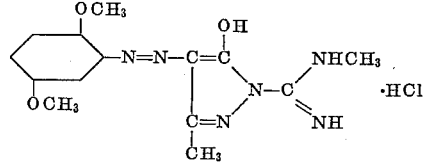

(17) The dye of Example 2 of U.S. 2,945,849,

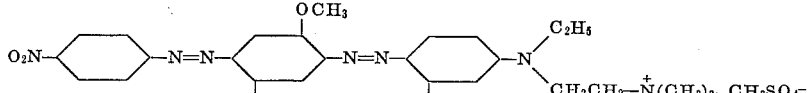

(18) The fourth dye in the table under Ex. 4 of U.S. 2,945,849,

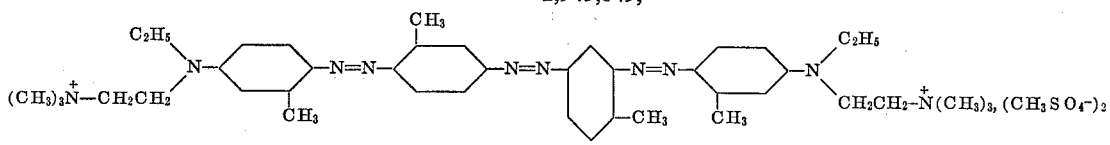

(19) The hydrochloride of the dye of Example 6 of U.S. 2,945,849,

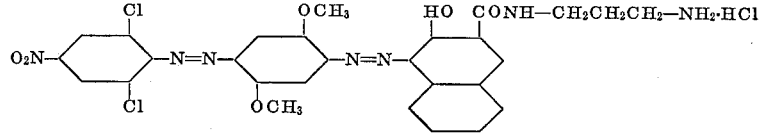

(20) The hydrochloride of the third dye in the table under Example 6 of U.S. 2,945,849,

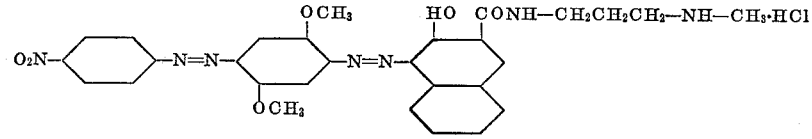

(21) The dye of Example 1 of U.S. 2,965,631,

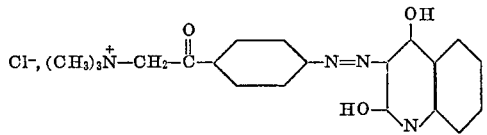

(22) The hydrochloride of the dye of Example 4 of U.S. 2,972,508,

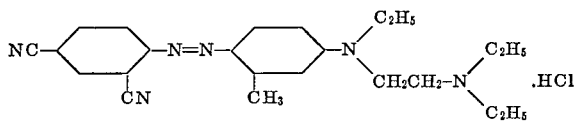

(23) The hydrochloride of the dye of Example 30 of U.S. 2,972,508,

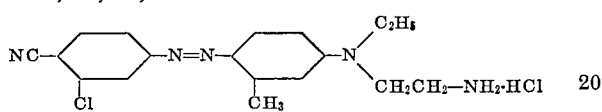

(24) The hydrochloride of the dye of Example 32 of U.S. 2,972,508,

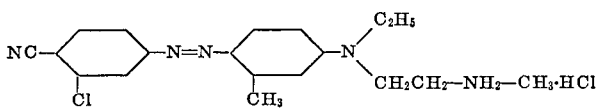

(25) The dye of Example 16 of U.S. 2,972,508,

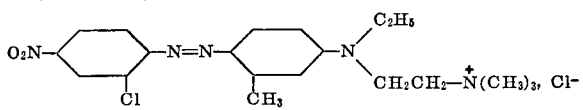

(26) The dye of Example 24 of U.S. 2,972,508,

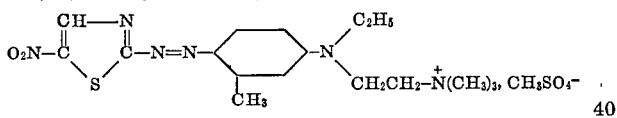

(27) The dye of Example 2 of U.S. 3,020,272,

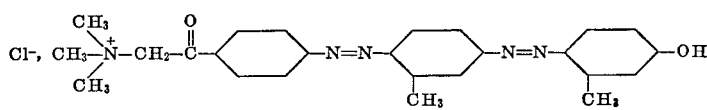

(28) The dye of Example 1 of U.S. 3,033,847,

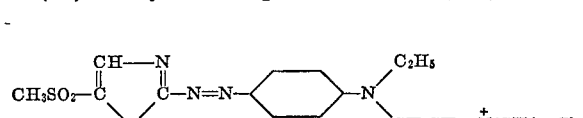

(29) The dye of Example 2 of U.S. 3,033,847,

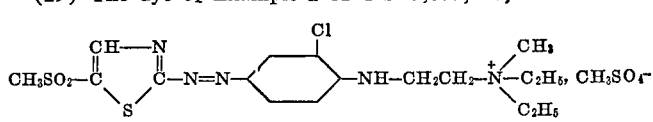

(30) The dye of Example 1 of U.S. 3,074,926,

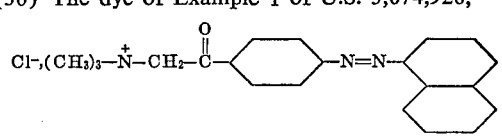

(31) The dye of Example 55 of U.S. 3,074,926,

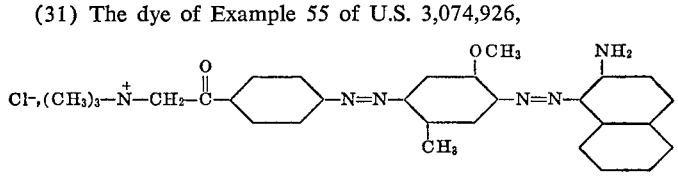

(32) The dye of Example 2 of U.S. 3,079,377,

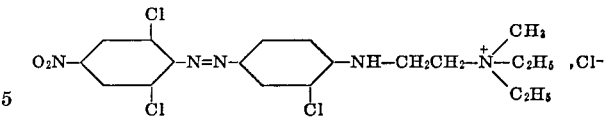

(33) The hydrochloride of the dye of Example 1 of U.S. 3,096,319,

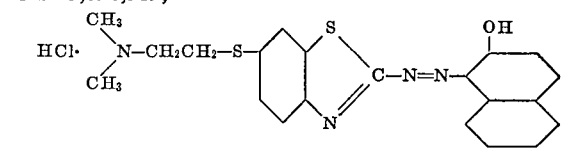

(34) The hydrochloride of the dye of Example 2 of U.S. 3,096,318,

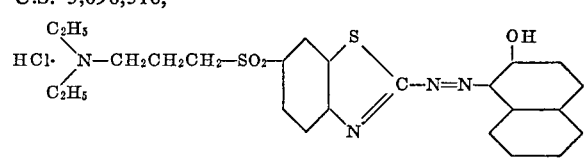

(35) The hydrochloride of the dye of Example 3 of U.S. 3,099,652,

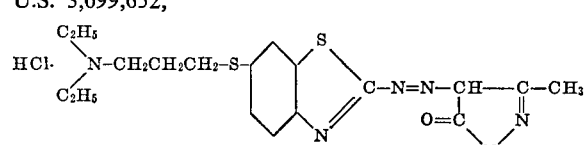

(36) The hydrochloride of the dye of Example 1 of U.S. 3,099,653,

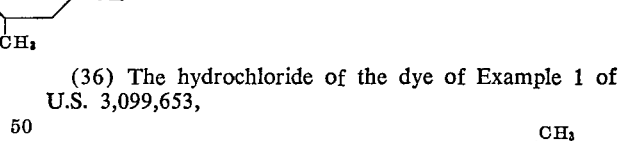

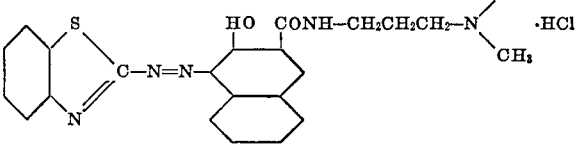

(37) The dye of the structure

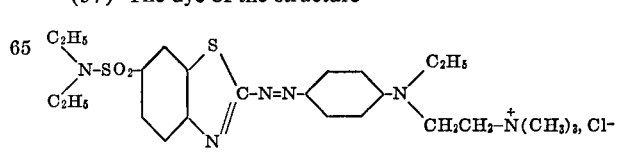

(38) The dye of the structure

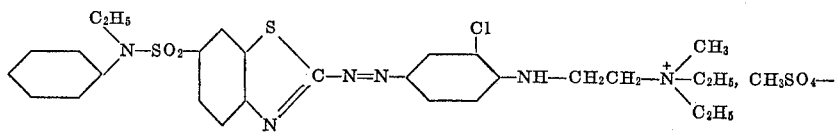

(39) The hydrochloride of the dye on p. 7, line 88, under Type 2 of British Patent 459,594,

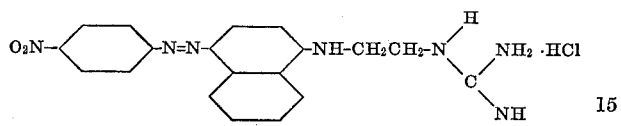

(40) The hydrochloride of the dye on p. 8, line 15, under Type 4 of British Patent 459,594,

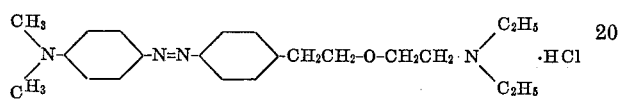

(41) The hydrochloride of the dye on p. 8, line 86, under Type 16 of British Patent 459,594,

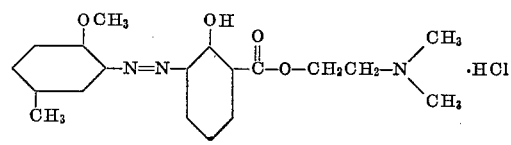

(42) The dye at p. 8, line 39, under Type 5 of British Patent 459,594,

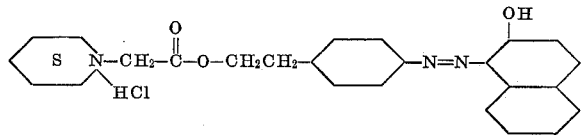

(43) The dye at p. 8, line 75, under Type 15 of British Patent 459,594,

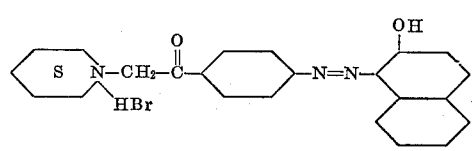

(44) The dye of Example 2 of British Patent 894,389,

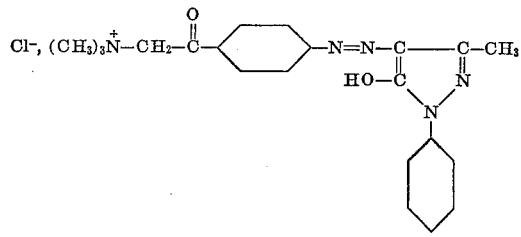

(45) The dye of Example 5 of British Patent 894,389,

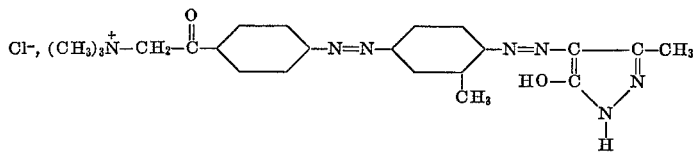

(46) The dye of Example 1 of British Patent 896,681,

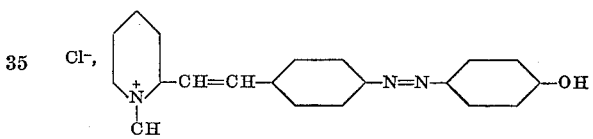

(47) The hydrochloride of the dye of Example 1 of German Patent 1,085,276,

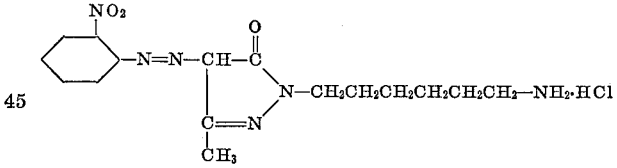

(48) The hydrochloride of the dye of Example 4 of German Patent 1,085,276,

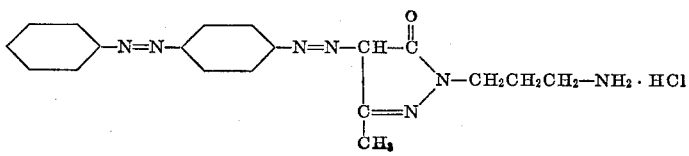

(49) The hydrochloride of the dye base (prior to alkylation) of Example 1 of Germany Patent 1,088,631,

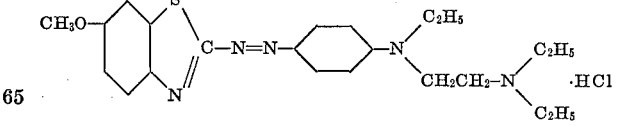

(50) The dye of Example 1 of German Patent 1,135,589,

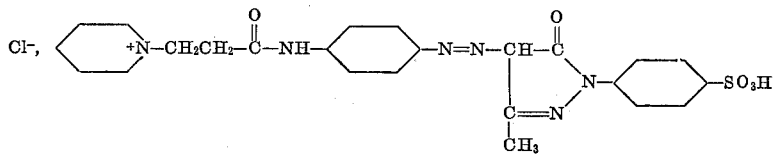

(51) The dye of Example 1 of French Patent 1,271,416,

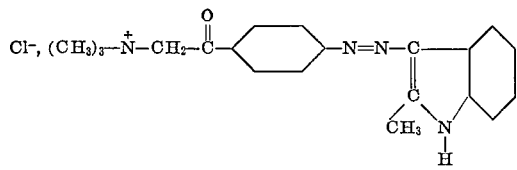

(52) The dye of Example 7 of French Patent 1,271,416,

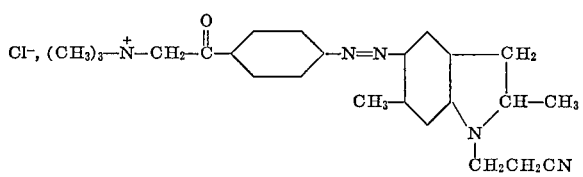

(53) The dye of Example 1 of French Patent 1,295,862,

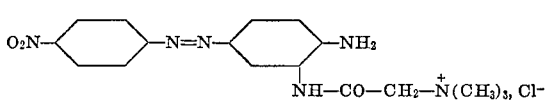

(54) The dye of Example 5 of French Patent 1,295,862,

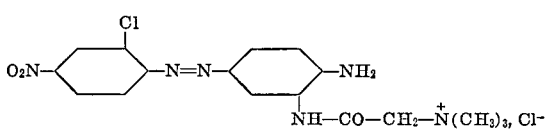

(55) The dye of Example 10 of French Patent 1,295,862,

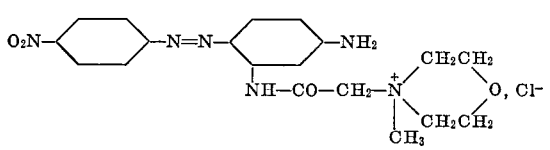

Several of the pendant basic azo dyes listed in Example 21 are shown in the form of the hydrochloride of the dye base. The dye bases occur as the primary, secondary or tertiary amino derivatives. The hydrochloride salts of these are readily obtained by passing dry hydrogen chloride gas over an agitated alcohol solution of the dye base at 60° C. The hydrochloride salt which precipitates is filtered off and washed with alcohol. In an alternate process, the dye base is dissolved in water in the presence of hydrochloric acid and the dye salt is salted out of solution with sodium chloride or sodium sulfate.

PART V.—PENDANT BASIC ANTHRAQUINONE DYE COMPLEXES

Preferred complexes are those of Example 22(a), Example 23(14) and Example 24.

Example 22

(a) 112 parts of the pendant basic anthraquinone dye

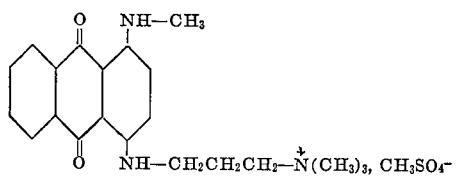

(prepared by condensation of 1-bromo-4-methylaminoanthraquinone and N,N-dimethyl-1,3-propanediamine followed by quaternization with dimethyl sulfate, see Example 2 of British Patent 807,241) are dissolved in 7000 parts of water by heating to 80° to 85° C. A phosphomolybdic acid solution is prepared in a separate container by dissolving 110 parts of ammonium molybdate, $(NH_4)_6Mo_7O_{24} \cdot 4H_2O$, six parts of disodium acid phosphate, $Na_2HPO_4 \cdot 7H_2O$, and 80 parts of an 88% solution of formic acid in 3600 parts of water. The acid solution is added to the hot dye solution until a spot test on paper shows no color bleed, indicating that the dye is completely precipitated as the phosphomolybdic acid complex. The dye slurry is heated to 90° to 95° C., agitated at this temperature for one hour, then filtered. The filter cake, after washing with water to remove excess acid, consists of 143 parts of the dye complex salt and 490 parts of water. A fine dispersion of the product thus obtained is prepared by milling the filter cake with 25 parts of dispersant (the sodium salt of the condensation product of formaldehyde and 2-naphthalenesulfonic acid) by any of known techniques such as colloid milling or by stirring the paste in the presence of sand according to the process described in British Patent 435,614. The fine dispersed paste of the phosphomolybdate complex of the dye is further protected from settling by incorporating dextrine equivalent to 10% based on the weight of the paste. When a test portion of said paste is dissolved in dimethyl formamide, containing acetic acid, and compared spectrophotometrically with a like solution of the pure dye starting material, it is found that 5.60 parts of the paste product have the same color value as one part of the pure basic anthraquinone dye.

(b) The phosphotungstic acid complex of the pendant basic anthraquinone dye used in part (a) of this example is prepared by following the above procedure except that the 110 parts of ammonium molybdate are replaced by 150 parts of sodium tungstate ($Na_2WO_4$).

(c) The phosphotungstomolybdic acid complex is prepared by replacing the 110 parts of ammonium molybdate in the procedure of part (a) of this example with a mixture of 112 parts of sodium tungstate and 48 parts of sodium molybdate ($Na_2MoO_4$). The ratio of the tungstate and molybdate salts may be varied extensively.

(d) The silicomolybdic acid complex of the pendant basic anthraquinone dye used in part (a) of this example is prepared by first dissolving 112 parts of the dye in 7000 parts of water containing 31 parts of formic acid. A solution of silicomolybdic acid is prepared in a separate vessel by dissolving 121 parts of sodium molybdate ($Na_2MoO_4$) and 117 parts of a 40% solution of sodium silicate ($Na_2Si_4O_9$) in 2400 parts of water at 90° C. 890 parts of 18% (by weight) sulfuric acid are added to the hot sodium molybdate-sodium silicate solution. The silicomolybdic acid solution so obtained is added to the hot dye solution to precipitate the silicomolybdate complex of the dye. The dye complex is filtered while hot and washed free of strong mineral acid with cold water. The dye complex is then dispersed and milled as described in part (a) above for the phosphomolybdate complex.

(e) The silicotungstic acid complex is prepared by following the procedure of part (d) above except that the 121 parts of sodium molybdate are replaced by 175 parts of sodium tungstate.

(f) The silicotungstomolybdic acid complex is prepared by following the procedure of part (d) above except that the solution of inorganic salts is replaced by a solution which contains 117 parts of a 40% solution of sodium silicate, 60 parts of sodium molybdate and 87 parts of sodium tungstate in 2400 parts of water.

The dye-heteropoly acid complex salts prepared in this example dye and print acid-modified polyacrylic and acid-modified polyester fibers in level, speck-free blue shades, even though the conventional anionic additives are employed in the dyeing and printing systems.

Example 23

When the pendant basic anthraquinone dye used in Example 22 parts (a) to (f), is replaced with chemically equivalent amounts of any of the following pendant basic anthraquinone dyes, their corresponding heteropoly acid complex salts are obtained which achieve the advantages heretofore described. In the following dye structures,

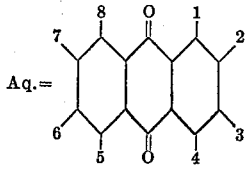

(1) The dye of Example 2 of U.S. Patent 2,153,012,

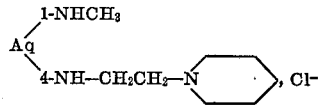

(2) The dye of Example 6 of U.S. Patent 2,153,012,

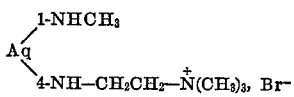

(3) The dye of Example 10 of U.S. Patent 2,153,012,

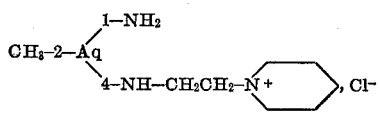

(4) The hydrochloride of the dye of Example 5 of U.S. Patent 2,183,652 except that the 20 parts of monoethanolamine are replaced by 29 parts of the "unsymmetrical diethyl ethylene diamine" disclosed on p. 2, col. 1, line 2 of the patent,

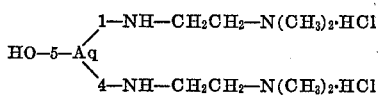

(5) The hydrochloride of the dye of Example 9 of U.S. Patent 2,611,772 (prepared in absence of air), $$Aq\text{-}1,4,5,8\text{-tetra-NH}-(CH_2)_3-N(CH_3)_2 \cdot 4HCl$$

(6) The hydrochloride of the dye of Example 9 of U.S. Patent 2,611,772 (prepared in the presence of air),

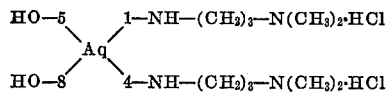

(7) The dye of Example 1 of U.S. Patent 2,701,801,

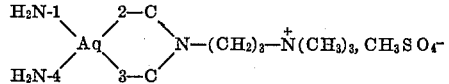

(8) The dye of Example 3 of U.S. Patent 2,701,801,

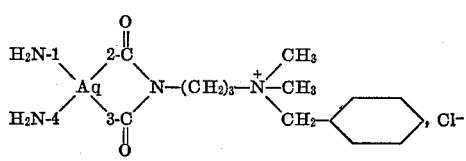

(9) The hydrochloride of the dye of Example 1 of U.S. Patent 2,701,802,

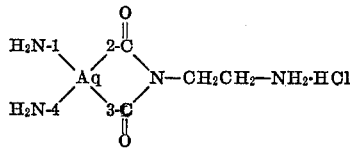

(10) The hydrochloride of the dye of Example 8 of U.S. Patent 2,701,802,

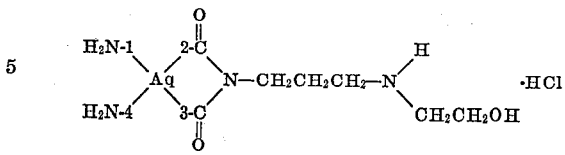

(11) The hydrochloride of the dye of Example 9 of U.S. Patent 2,701,802,

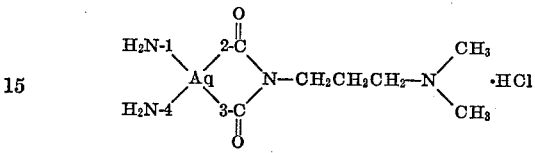

(12) The hydrochloride of the dye of Example 1 of U.S. Patent 2,716,655,

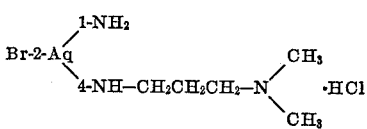

(13) The hydrochloride of the dye of Example 3 of U.S. Patent 2,716,655,

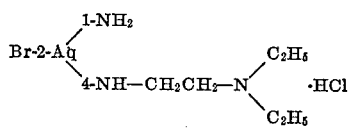

(14) The dye of Example 5 of U.S. Patent 2,716,655,

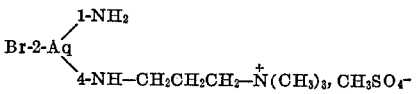

(15) The cationic dye of Example 1 of U.S. Patent 2,737,517,

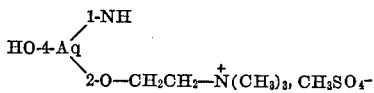

(16) The cationic dye of Example 2 of U.S. Patent 2,888,467,

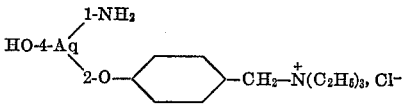

(17) The dye hydrochloride of Example 5 of U.S. Patent 2,888,467,

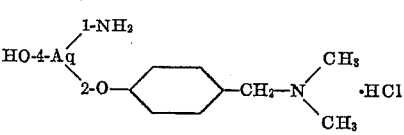

(18) The cationic dye of Example 1 of U.S. Patent 2,924,609,

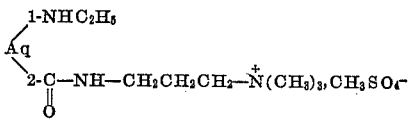

(19) The dye of Example 1 of U.S. Patent 3,036,078,

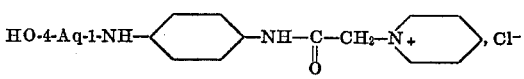

(20) The dye of Example 2 of U.S. Patent 3,036,078,

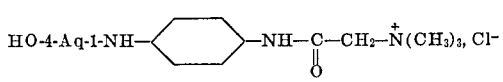

(21) The dye of Example 11 of U.S. Patent 3,036,078,

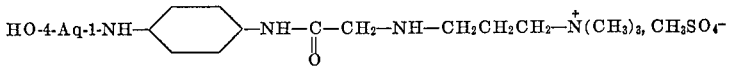

(22) The dye of Example 10 of U.S. Patent 3,036,078 (third paragraph),

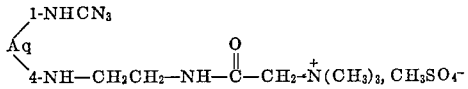

(23) The hydrochloride of the dye of the second paragraph of Example 10 of U.S. Patent 3,036,078,

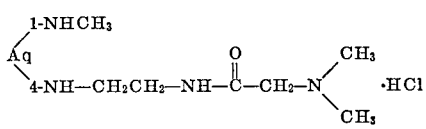

(24) The hydrochloride of the dye of Example 1 of U.S. Patent 3,040,064, prepared from 2-bromoquinizarin and 1,3-dimethylpropylenediamine,

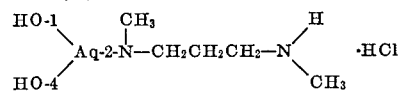

(25) The cationic dye of Example 2 of U.S. Patent 3,040,064,

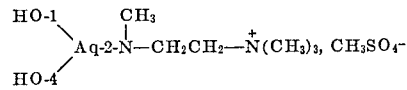

(26) The cationic dye of Example 1 of U.S. Patent 3,076,821,

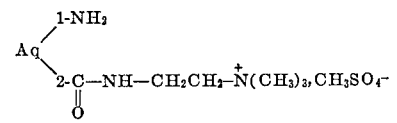

(27) The cationic dye of Example 6 of U.S. Patent 3,076,821,

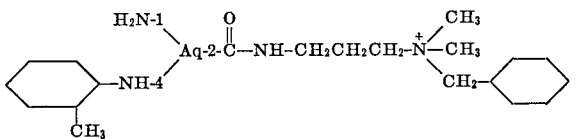

(28) The dye of Example 1 of Canadian Patent 624,035,

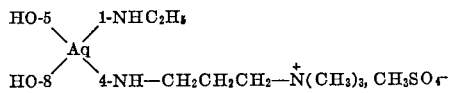

(29) The dye of Example 7 of Canadian Patent 624,035,

(30) The hydrochloride of the dye of Example 1 of British Patent 459,594,

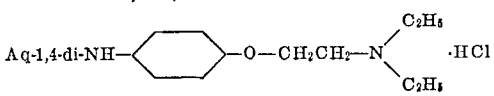

(31) The hydrochloride of the dye of Example 8 of British Patent 459,594,

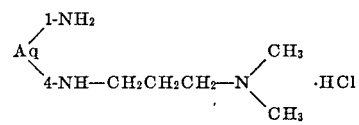

(32) The hydrochloride of the violet anthraquinone dye under Type 7, p. 8 of British Patent 459,594,

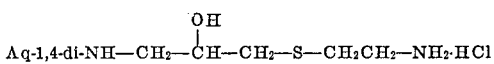

(33) The dye of Example 5 of British Patent 807,241,

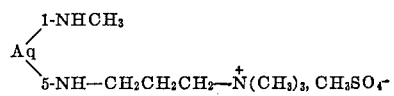

(34) The hydrochloride of the dye of Example 4 of British Patent 807,241,

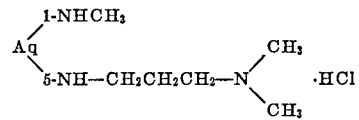

(35) The first dye of Table I on p. 589 of the Journal of the American Chemical Society, vol. 76 (1954),

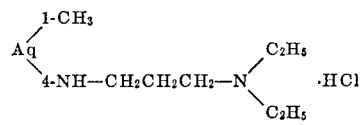

(36) The hydrochloride of the dye of Example 1 of British Patent 824,530,

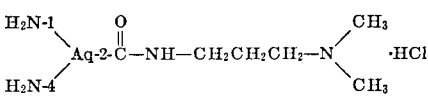

(37) The hydrochloride of the dye of Example 6 of British Patent 824,530,

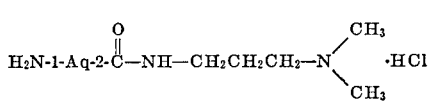

(38) The hydrochloride of the dye of Example 1 of British Patent 925,111,

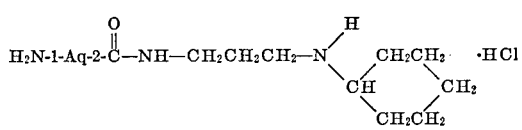

(39) The hydrochloride of the dye of Example 2 of British Patent 925,111,

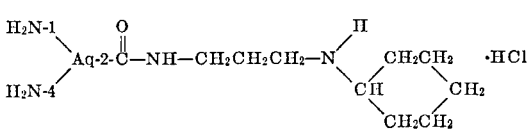

(40) The dye of Example 2 of German Patent 714,986,

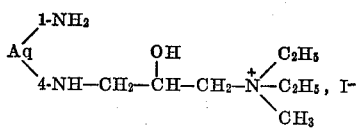

(41) The dye of Example 10 of German Patent 714,986,

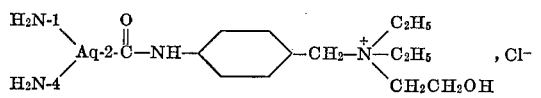

(42) The hydrochloride of the dye of Example 5 of German Patent 1,073,129

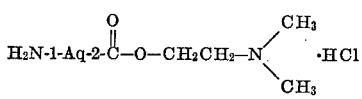

(43) The hydrochloride of the dye of Example 10 of German Patent 1,073,129

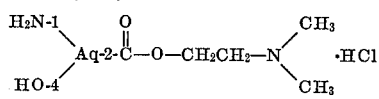

(44) The hydrochloride of the dye of Example 12 of German Patent 1,073,129

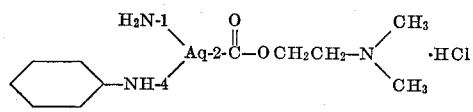

(45) The hydrochloride of the dye of Example 2 of German Patent 1,082,916, $$Aq\text{-}1\text{—}NH\text{—}CH_2CH_2\text{—}NH_2 \cdot HCl$$

(46) The cationic dye formulated in the Resume of French Patent 1,277,495,

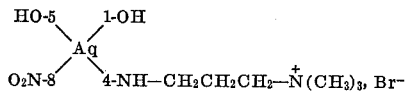

(47) The cationic dye prepared from dimethyl sulfate and 1-amino-4-hydroxy-2-(2-dimethylaminoethyl)-mercaptoanthraquinone as described in Belgian Patent 609,667,

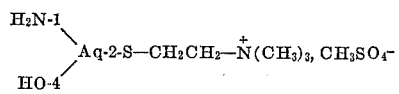

EXAMPLE 24

87.4 parts of the pendant basic anthraquinone dye

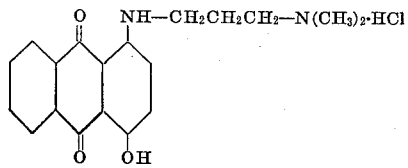

are employed in the process of Example 22(a) in place of 112 parts of the basic dye formulated in that example. The washed filter cake obtained consists of 151 parts of the phosphomolybdate complex of the dye and 86.7 parts of water. A fine dispersion of the product thus obtained is prepared by colloid-milling the filter cake after addition of 9.3 parts of the sodium salt of lignin sulfonic acid, 9.3 parts of the sodium salt of the condensation product of formaldehyde and 2-naphthalenesulfonic acid and 49 parts of water. When a test portion of the milled paste is dissolved in dimethyl formamide, containing acetic acid, and compared spectrophotometrically with a like solution of the pure dye starting material, it is found that 3.4 parts of the paste product have the same color value as one part of the pure basic anthraquinone dye.

The dye complex salt prepared in this example dyes and prints acid-modified polyacrylic and acid-modified polyester fibers in level, speck-free violet shades, even though the conventional anionic additives are employed in the dyeing and printing systems.

The pendant basic anthraquinone dye, used as starting material in this example may be prepared by condensing quinizarin with N,N-dimethyl-1,3-propanediamine followed by conversion of the dye base to its hydrochloride salt.

The hydrochloride salt is readily obtained by passing dry hydrogen chloride gas over an agitated alcohol solution of the dye base at 60° C. The hydrochloride salt which precipitates is located by filtration and washed with alcohol.

In an alternate process the dye base is dissolved in water in the presence of formic acid, acetic acid or a mineral acid such as hydrochloric or sulfuric acid, and the dye salt is salted out of solution with sodium chloride or sodium sulfate.

MODIFICATIONS AND EQUIVALENTS (1) Preparation of the basic dye-heteropoly acid complexes (parts III, IV and V)

The scope of "basic dyes" which may be utilized in the practice of this invention has been described heretofore.

Processes for manufacturing the complexes are detailed in Examples 17, 19 and 22. In general, the basic dye is dissolved in aqueous acidic medium and is then precipitated by an aqueous solution of heteropoly acid. Complete precipitation of dye complex by the heteropoly acid is readily determined by a spot test on paper. When precipitation is complete, there will no longer be a color bleed of the soluble dye on the paper. The isolated dye complex is preferably milled in the presence of a dispersant to provide a dispersed paste which is readily incorporated into printing formulations. The dispersed pastes may be dried and ground, if desired, for use in dyeing operations, but these additional steps are not included in the preferred mode of operation for economic reasons.

The preferred dispersants for the basic dye complexes are those of the anionic type such as the alkali metal or ammonium salts of the lignin sulfonic acids and the alkali metal, alkaline earth metal or ammonium salts of the condensation product of formaldehyde and 1- or 2-naphthalenesulfonic acid.

It is to be understood that the various heteropoly acids may be used alone or mixed in any proportion when preparing the basic dye complexes for use in this invention.

(2) Printing (part I) and dyeing (part II)

The examples of part I illustrate numerous combinations in which the printing problems mentioned above under the heading "Background of the Invention" have been solved.

When it is considered that: (1) basic dyes are normally dissolved in making a printing paste, yet specks are not avoided in many printing formulations, and (2) the basic dye-heteropoly acid complexes are not dissolved in the printing pastes, the speck-free and level prints obtained from the latter are indeed surprising.

Either neutral or acidic thickeners may be employed in formulations with the basic dye-heteropoly acid complexes as shown in the examples. This free choice of printing thickeners gives the commercial printer another degree of freedom in making the printing formulations.

Although the dyeing examples relate mainly to pad dyeing operations, it is clear from the compatibility comparisons of basic dyes and complexed basic dyes in numerous dyebath systems that the basic dye complexes offer advantages in any dyeing process where color precipitation and specking are hazards for the dyes at some stage of the operation.

It was not to be expected that the heteropoly acid complexes would dissociate in the dyeing and printing operations, particularly in the presence of anionic materials in such a manner that the basic dyes themselves are quantitatively transferred to the anionic polymeric fibers in speck-free and level shades.

(3) In general (a) Temperature.—A temperature range of about 190° to 230° F. is given in claim 1. This is a preferred and practical range. It will be obvious that time and temperature are related in operations of dye application. In the rapid dyeing of anionic polymeric fibers the higher temperatures are used. It is known that certain commercial brands of acid-modified polyacrylic fibers soften at about 225° to 230° F., whereas acid-modified polyester fibers are often pressure dyed without carriers at temperatures up to 250° F. Although temperatures higher than 230° F. may be used in extremely rapid coloration of acid-modified polyacrylic fibers, it is preferred to employ temperatures of about 210° to 220° F.

(b) pH.—The colorations are generally performed within the range of about pH 2 to 7. When the anionic fibers are colored as self-fibers, it is the practice to recommend a pH of about 4–6. In dyeing fiber blends involving wool, the pH of the acidic dye bath may drop to 2 or even lower. On the other hand, in fiber blends involving cotton, the pH of the dye bath is nearer the neutral point or higher. When vat dyes are used to color the cotton of such blends, an additional step is used (see Examples 8 and 11) in which the pH is higher than 7 for the vat dyeing operation.

(c) Fiber blends.—It is to be understood that the anionic fibers such as acid-modified polyacrylic and acid-modified polyester, as well as mixtures of these fibers, may be used interchangeably throughout the examples of the present application. For instance, the acid-modified polyacrylic-wool blend of Example 10 may be replaced by a 55:45 acid-modified polyester-wool blend, and the acid-modified polyacrylic-rayon or cotton blends of Examples 5 and 12, respectively, may be replaced by acid-modified polyester-rayon or cotton blends. Likewise, the wool in the fiber blends may be replaced by nylon or basic-modified polyacrylic fibers. By basic-modified polyacrylic fibers, we refer to such synthetic fibers as those described in U.S. Patents 2,491,471 and 3,065,211. When disperse dyes are applied in coloring operations involving the basic dye complexes and anionic fibers, said fibers may be used alone or in blends with unmodified polyester (e.g. polyethylene terephthalate), nylon, cellulose acetate or basic-modified polyacrylic fibers.

(d) Dye mixtures.—The examples illustrate the particular versatility of coloring mixed fiber blends with mixed dye types in which the basic dye complexes exhibit outstanding advantages over the uncomplexed basic dyes. Also, anionic polymeric fibers alone may be colored with mixed dye types, such as a mixture of basic and disperse dyes as shown in Examples 1–4. It is to be understood that the application of the basic dye complexes in the simultaneous coloration of these acid-modified fibers with disperse dyes likewise shows the advantages enumerated above.

Another type of dye mixture useful in the present invention is illustrated by heteropoly acid complexes of mixtures of basic dyes such as Brilliant Green (C.I. 42,040), Fuchsine (C.I. 42,510) and Chrysoidine (C.I. 11,270) to provide black shades which are level and speck-free.

(4) Pendant basic azo dye complexes (part IV)

A variety of pendant basic azo dyes, representing essentially all of such types known today, is illustrated in Examples 19 to 21. The patents listed in Example 21 disclose the azo dye base requirements of the present invention and which are all operable in the practice of this invention.

(5) Pendant basic anthraquinone dye complexes (part V)

Many types of colored anthraquinone compounds which consist of single anthraquinone nuclei to which are attached from 1 to 4 primary, secondary or tertiary amino or quaternary ammonium groups through a pendant aliphatic carbon atom are exemplified in Examples 22 to 24. The various compounds of the patents referenced and illustrated in Example 23 may be utilized in the practice of the present invention. Several of the pendant amino anthraquinone dyes listed in Example 23 are used as their hydrochloride salt. General methods for preparing these hydrochlorides are given in Example 24.

The preceding representative examples may be varied within the scope of the present total specification disclosure, as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for the coloration of anionic polymeric fibers which comprises intimately contacting said fibers at a pH of 2 to 7 and at a temperature of from room temperature to 170° F. with a coloration medium comprising an aqueous dispersion of a heteropoly acid complex of a basic dye, said heteropoly acid being selected from the group consisting of phosphotungstic, phosphomolybdic, phosphotungstomolybdic, silicotungstic, silicomolybdic and silicotungstomolybdic acids, developing the coloration at 190° to 230° F. whereby the reaction which forms said basic dye complex is reversed and the parent basic dye is formed on the anionic polymeric fibers, and eliminating the heteropoly acid portion of the complex from the finished coloration.

2. The process of claim 1 in which the anionic polymeric fibers are selected from the group consisting of acid-modified polyacrylic and acid-modified polyester fibers.

3. The process of claim 2 wherein said basic dye complex is first prepared in the form of a dispersed paste by milling said complex with a dispersant in aqueous medium.

4. The process of claim 2 conducted as a printing operation in the presence of a printing thickener.

5. The process of claim 2 conducted as a pad dyeing operation.

6. The process of claim 2 wherein said anionic polymeric fibers are colored with a coloration medium comprising a blend of said basic dye complex and a disperse dye.

7. The process of claim 2 wherein the coloration is developed at a temperature of 210°–220° F.

8. The process of claim 2 wherein said anionic fibers are present in mixed goods with fibers selected from the group consisting of wool, nylon, polyethylene terephthalate, basic-modified polyacrylonitrile, cellulose acetate and cellulose fibers.

9. The process of claim 8 wherein said anionic polymeric fibers are colored with said basic dye and at least one of said additional fibers is colored with a dye selected from the group consisting of non-reactive acid, disperse, direct and vat dyes, and fiber-reactive dyes.

References Cited

UNITED STATES PATENTS 2,215,196    9/1940    Schlack _____ 8—29
2,741,605    4/1956    Swilgmeyer.

(Other references on following page)

References Cited

| | | | |
|---|---|---|---|
| 2,872,449 | 2/1959 | Baumann et al. | 260—157 |
| 2,922,690 | 1/1960 | Mueller et al. | 8—21 |
| 3,129,053 | 4/1964 | Castle | 8—93 |
| 3,190,850 | 1/1965 | Burke. | |

OTHER REFERENCES

L. Diserens: The Chemical Technology of Dyeing and Printing, vol. II, 1951, pp. 92–94, 99–104, pub. by Reinhold Pub. Corp., New York, N.Y.

J. A. Leddy: ADR, Apr. 18, 1960, pp. 57–58, 65–68.

Schlaeppi: ADR, June 2, 1958, pp. 377–382.

C. C. Wilcock et al.: Whittaker's Dyeing With Coal Tar Dyestuffs, 6th ed., p. 23, Balliere, Tindall and Cox, London, England.

GEORGE F. LESMES, Primary Examiner

T. J. HERBERT, Jr., Assistant Examiner

U.S. Cl. X.R.

8—30, 162